(12) United States Patent
Nomura

(10) Patent No.: US 7,515,815 B2
(45) Date of Patent: Apr. 7, 2009

(54) IMAGING DEVICE HAVING AN OPTICAL IMAGE STABILIZER

(75) Inventor: Hiroshi Nomura, Saitama (JP)

(73) Assignee: Hoya Corporation, Tokyo (JP)

( * ) Notice: Subject to any disclaimer, the term of this patent is extended or adjusted under 35 U.S.C. 154(b) by 441 days.

(21) Appl. No.: 11/289,601

(22) Filed: Nov. 30, 2005

(65) Prior Publication Data

US 2006/0115256 A1      Jun. 1, 2006

(30) Foreign Application Priority Data

Dec. 1, 2004      (JP)      ............................. 2004-349185

(51) Int. Cl.
*G03B 17/00*      (2006.01)

(52) U.S. Cl. ..................... 396/55; 348/208.7

(58) Field of Classification Search ................. 396/55, 396/73–75, 349–350; 348/208.4–208.7, 348/208.11, 208.13
See application file for complete search history.

(56) References Cited

U.S. PATENT DOCUMENTS

| | | | |
|---|---|---|---|
| 3,882,520 A * | 5/1975 | Kamp et al. ................... | 396/73 |
| 4,768,048 A | 8/1988 | Wakabayashi | |
| 5,416,558 A * | 5/1995 | Katayama et al. ............. | 396/52 |
| 5,430,516 A | 7/1995 | Uziie et al. | |
| 5,739,962 A | 4/1998 | Asakura et al. | |
| 5,986,826 A * | 11/1999 | Kosaka et al. ................ | 359/814 |
| 6,031,998 A * | 2/2000 | Shono ........................ | 396/75 |
| 6,366,323 B1 | 4/2002 | Shono | |
| 6,587,270 B2 * | 7/2003 | Terada ........................ | 359/554 |
| 6,606,457 B2 * | 8/2003 | Enomoto ..................... | 396/55 |
| 6,978,089 B2 | 12/2005 | Nomura et al. | |
| 2003/0067544 A1 * | 4/2003 | Wada ....................... | 348/208.7 |
| 2003/0156832 A1 | 8/2003 | Nomura et al. | |
| 2005/0232617 A1 | 10/2005 | Uenaka et al. ................ | 396/55 |
| 2006/0083503 A1 * | 4/2006 | Fukai .......................... | 396/55 |

FOREIGN PATENT DOCUMENTS

| | | |
|---|---|---|
| JP | 6-46314 | 2/1994 |
| JP | 2003-110928 | 4/2003 |

(Continued)

OTHER PUBLICATIONS

U.S. Appl. No. 11/289,556 to Nomura, which was filed Nov. 30, 2005.

(Continued)

*Primary Examiner*—Bot LeDynh
(74) *Attorney, Agent, or Firm*—Greenblum & Bernstein, P.L.C.

(57) ABSTRACT

An imaging device includes a guiding device which guides at least one radially-retractable optical element, serving as part of a photographing optical system, along a guide direction between a photographing position on a common optical axis of the photographing optical system and a radially-retracted position away from the common optical axis in a plane orthogonal to the common optical axis; a detector for detecting a direction and a magnitude of vibration applied to the photographing optical system; and a common actuator for moving the radially-retractable optical element along the guide direction to counteract the vibration in accordance with an output of the detector when the radially-retractable optical element is in the photographing position, and for moving the radially-retractable optical element along the guide direction between the photographing position and the radially-retracted position.

18 Claims, 20 Drawing Sheets

FOREIGN PATENT DOCUMENTS

| | | |
|---|---|---|
| JP | 2003-111449 | 4/2003 |
| JP | 2004-48266 | 2/2004 |

OTHER PUBLICATIONS

U.S. Appl. No. 11/289,557 to Nomura, which was filed Nov. 30, 2005.
U.S. Appl. No. 11/289,478 to Nomura, which was filed Nov. 30, 2005.
U.S. Appl. No. 11/289,594 to Nomura, which was filed Nov. 30, 2005.
U.S. Appl. No. 11/289,560 to Nomura, which was filed Nov. 30, 2005.
U.S. Appl. No. 11/289,600 to Nomura, which was filed Nov. 30, 2005.
U.S. Appl. No. 11/289,481 to Nomura, which was filed Nov. 30, 2005.
U.S. Appl. No. 11/289,558 to Nomura, which was filed Nov. 30, 2005.
U.S. Appl. No. 11/289,602 to Nomura, which was filed Nov. 30, 2005.
U.S. Appl. No. 11/289,739 to Nomura, which was filed Nov. 30, 2005.
English Abstract of JP 6-46314, Feb. 18, 1994.
English Abstract of JP2003-110928, Apr. 11, 2003.
English Abstract of JP2003-111449, Apr. 11, 2003.
English Abstract of JP2004-48266, Feb. 12, 2004.
Reissue U.S. Appl. Nos. 10/815,193 and 10/815,194, filed Apr. 1, 2004.

* cited by examiner

IMAGING DEVICE HAVING AN OPTICAL IMAGE STABILIZER

This application claims foreign priority based on Japanese Patent Application No. 2004-349185, filed Dec. 1, 2004, the content of which is incorporated herein by reference in its entirety.

BACKGROUND OF THE INVENTION

1. Field of the Invention

The present invention relates to an imaging device, more specifically relates to an imaging device having an optical image stabilizer for counteracting image shake due to vibrations such as hand shake (camera shake).

2. Description of the Related Art

Imaging devices such as cameras which come with image stabilization or variants such as anti-shake for preventing image shake from occurring on an imaging surface when vibrations such as hand shake is applied to the imaging device are in practical use. However, such imaging devices having an optical image stabilizer (optical shift image stabilizer) are prone to being bulky and heavy.

SUMMARY OF THE INVENTION

The present invention provides a compact imaging device having an optical image stabilizer.

According to an aspect of the present invention, an imaging device is provided, including a guiding device which guides at least one radially-retractable optical element, serving as part of a photographing optical system, along a guide direction between a photographing position on a common optical axis of the photographing optical system and a radially-retracted position away from the common optical axis in a plane orthogonal to the common optical axis; a detector for detecting a direction and a magnitude of vibration applied to the photographing optical system; and a common actuator for moving the radially-retractable optical element along the guide direction to counteract the vibration in accordance with an output of the detector when the radially-retractable optical element is in the photographing position, and for moving the radially-retractable optical element along the guide direction between the photographing position and the radially-retracted position.

It is desirable for the guiding device to include a linear guide shaft which extends in a direction perpendicular to the common optical axis and with which a holder, holding the radially-retractable optical element, is slidably engaged to be guided along the linear guide shaft. The common actuator includes a feed screw shaft which is parallel to the linear guide shaft and is driven to rotate, and a linearly movable member which is screw-engaged with the feed screw shaft, wherein forward and reverse rotations of the feed screw shaft cause the linearly movable member to move forward and reverse along an axis of the feed screw shaft to thereby move the holder forward and reverse along the linear guide shaft, respectively.

It is desirable for the linear guide shaft to be longer than the feed screw shaft.

It is desirable for the imaging device to include a second guiding device which guides the radially-retractable optical element along a second guide direction different from the guide direction in the plane that is orthogonal to the common optical axis; and a second actuator for moving the radially-retractable optical element along the second guide direction to counteract the vibration in accordance with the output of the detector when the radially-retractable optical element is in the photographing position.

It is desirable for the guide direction of the guiding device and the second guide direction of second guiding device guide to be perpendicular to each other.

For example, the guiding device includes a first linear guide shaft which extends in a direction perpendicular to the common optical axis, and the second guiding device includes a second linear guide shaft which extends in a direction perpendicular to both the common optical axis and an axis of the first linear guide shaft.

It is desirable for the imaging device to include a biasing device which biases the radially-retractable optical element in a direction toward the photographing position from the retracted position.

It is desirable for the biasing device to include an extension coil spring which is extended in a direction parallel to the guide direction of the guiding device.

When the retractable optical element is in the radially-retracted position, another optical element can enter a space on the common optical axis which is occupied by the retractable optical element when the radially-retractable optical element is in the photographing position in a photographic state.

It is desirable for the another optical element to include a lens group of the photographing optical system.

It is desirable for the radially-retractable optical element to include an image sensor which is positioned at an imaging position of the photographing optical system when the radially-retractable optical element is in the photographing position in the photographic state.

It is desirable for the radially-retractable optical element to include a rearmost lens group of the photographing optical system.

It is desirable for the radially-retractable optical element to include a filter positioned between the rearmost lens group and the image sensor.

It is desirable for the common actuator be a stepping motor.

It is desirable for the second actuator to be a stepping motor.

It is desirable for the photographing optical system is constructed as a zoom lens system.

In an embodiment, an imaging device is provided, including a driving device which moves an image-stabilizing optical element of the photographing optical system in a plane orthogonal to a common optical axis of the photographing optical system to counteract image shake in accordance with a direction and a magnitude of vibration applied to the photographing optical system; and an actuator provided in the driving device. The actuator operates to move the image-stabilizing optical element within a predetermined range of movement for image stabilization on the common optical axis when the imaging device is in a photographic state, operates to move the image-stabilizing optical element to an off-optical-axis retracted position away from the common optical axis when the imaging device changes from the photographic state to a non-photographing state, and operates to move the image-stabilizing optical element from the off-optical-axis retracted position to the predetermined range of movement for image stabilization on the common optical axis when the imaging device changes from the non-photographing state to the photographic state.

In an embodiment, an imaging device is provided, including a detector for detecting a direction and a magnitude of vibration applied to a photographing optical system; a switching signal generator which generates a switching signal for switching the photographing optical system between a photographic state and a non-photographing state; and an actuator for moving an image sensor of the photographing optical system, which is positioned at an imaging position of the photographing optical system, in a plane orthogonal to a common optical axis of the photographing optical system. The actuator operates to move the image sensor so as to counteract the vibration in accordance with an output of the detector when the image sensor is in a photographing position on the common optical axis, and operates to move the image sensor between the photographing position on the common optical axis and an off-optical-axis retracted position away from the common optical axis when the switching signal generator generates the switching signal.

According to the present invention, an imaging device incorporating an optical image stabilizer which becomes compact in size by retracting the image sensor away from the common optical axis in a non-photographing state can be obtained. Specifically, a low-cost, compact and lightweight imaging device constructed of fewer number of elements can be achieved because a common actuator is used both for retracting the image sensor away from the common optical axis and for counteracting image shake.

The present disclosure relates to subject matter contained in Japanese Patent Application No. 2004-349185 (filed on Dec. 1, 2004), which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
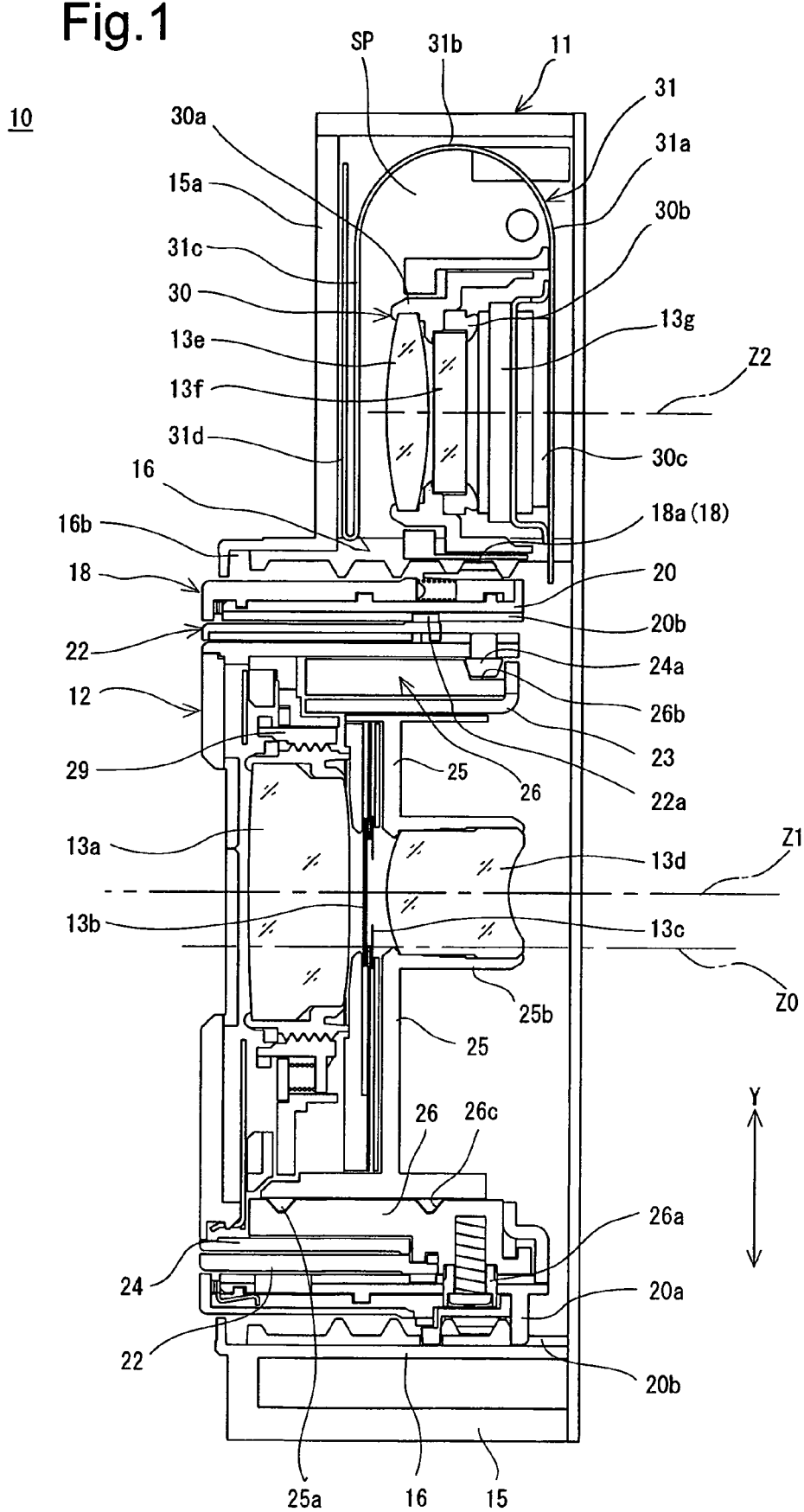
FIG. 1 is a cross-sectional view of an embodiment of a retractable zoom lens to which the present invention is applied in the retracted state of the zoom lens barrel.
Figure 2:
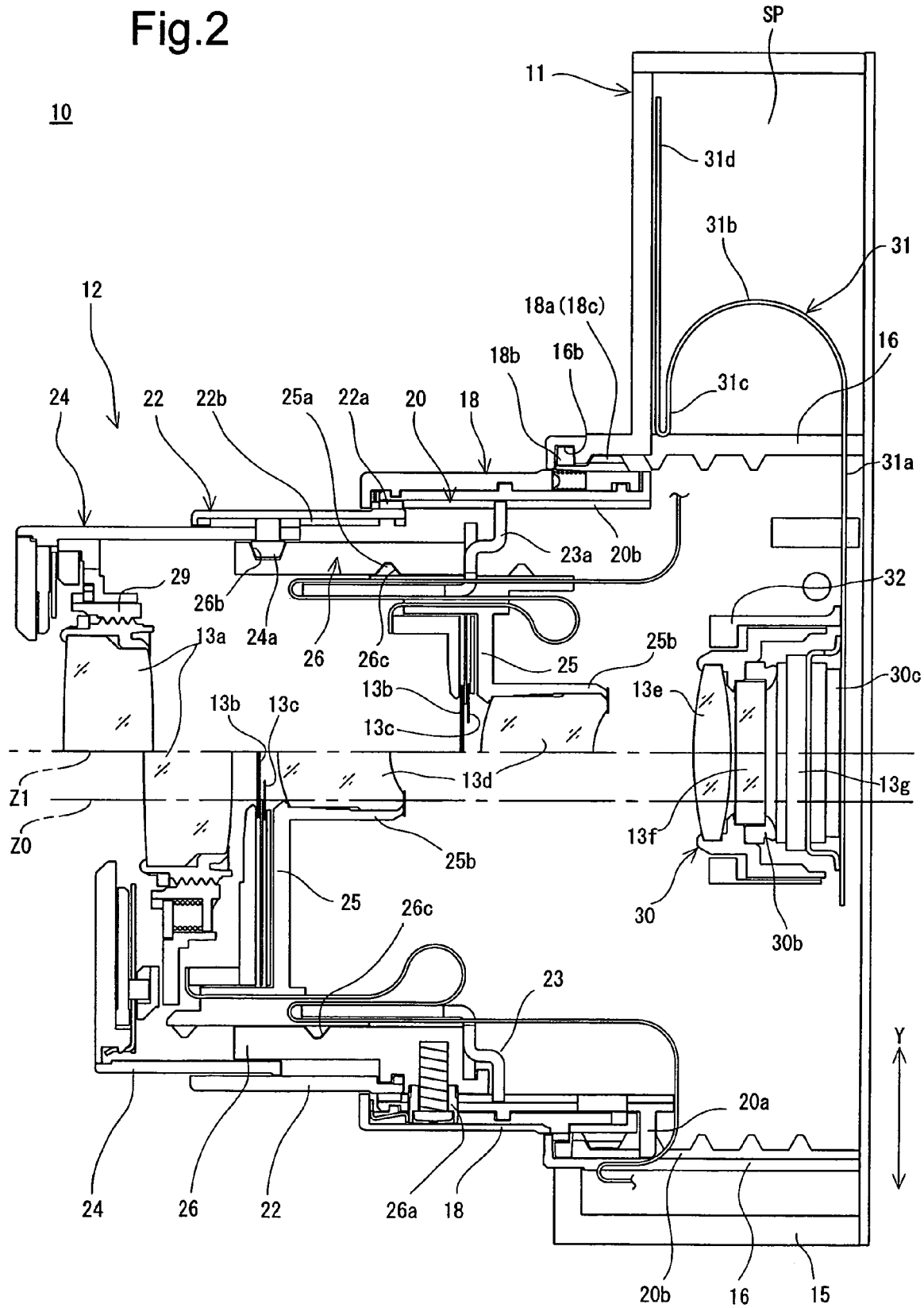
FIG. 2 is a cross-sectional view of the zoom lens shown in FIG. 1 in a photographic state of the zoom lens.
Figure 5:
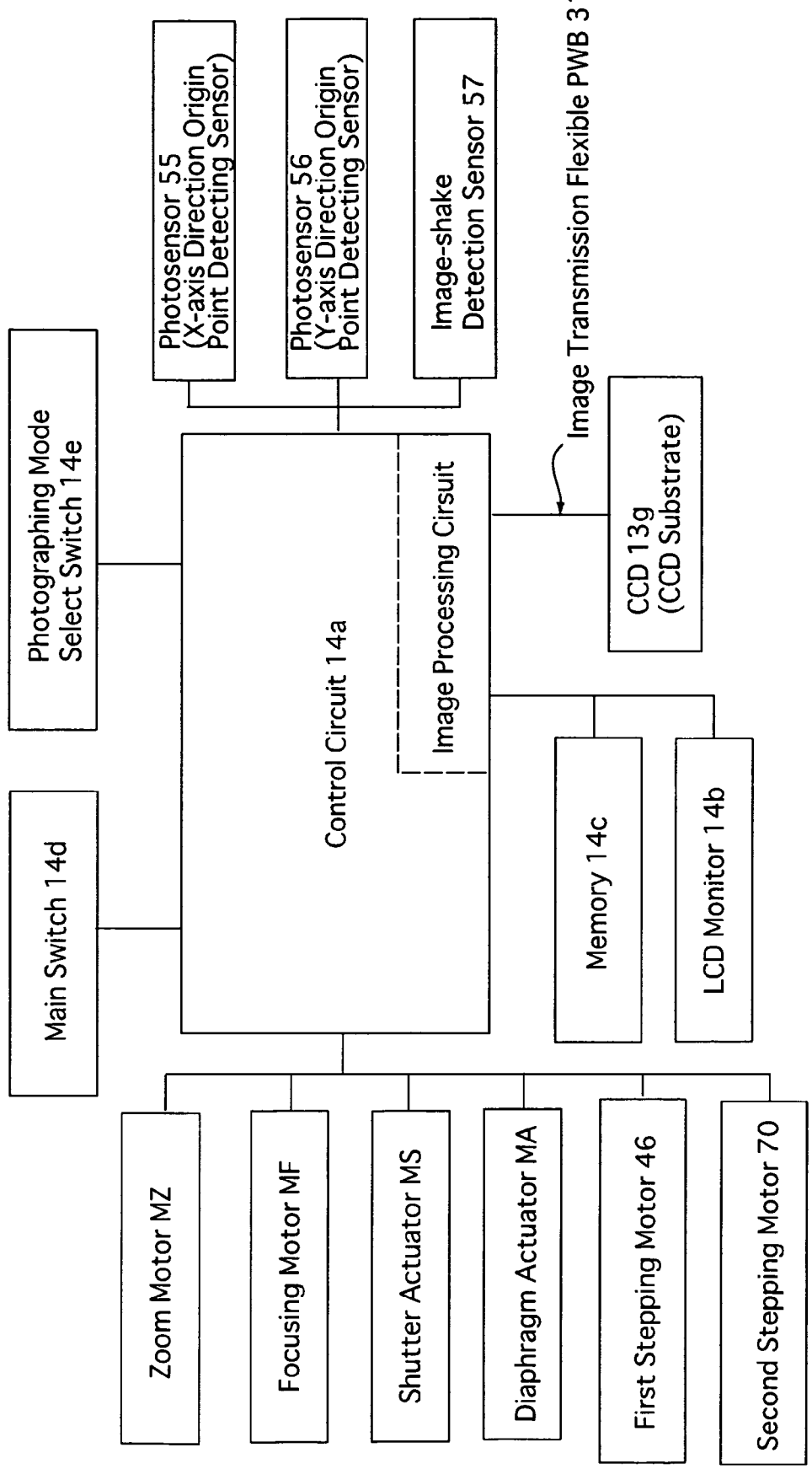
FIG. 5 is a block diagram illustrating a configuration of electrical circuits of a camera equipped with the zoom lens shown in FIGS. 1 and 2.

FIGS. 1 and 2 show cross-sections of a zoom lens 10 which is incorporated in a zoom lens camera. The zoom lens 10 is provided with a box-shaped housing 11 and a retractable barrel portion 12 retractably supported inside the housing 11. The outside of the housing 11 is covered by exterior components of the camera; the exterior components are not shown in the drawings. A photographing optical system of the zoom lens 10 includes a first lens group 13a, a shutter 13b, a diaphragm 13c, a second lens group 13d, a third lens group (radially-retractable optical element/image-stabilizing optical element) 13e, a low-pass filter (radially-retractable optical element/image-stabilizing optical element) 13f, and a CCD image sensor (radially-retractable optical element/image-stabilizing optical element) 13g (hereinafter referred to as a CCD), in that order from the object side (the left side as viewed in FIGS. 1 and 2). As shown in FIG. 5, the CCD 13g is electrically connected to a control circuit 14a having an image processing circuit. Thus, an electronic image can be displayed on an LCD monitor 14b provided on an outer surface of the camera, and the electronic image data can be recorded in a memory 14c. In a photographic state (ready-to-photograph state) of the zoom lens 10 shown in FIG. 2, all of the optical elements constituting the photographing optical system are aligned on the same photographing optical axis (common optical axis of the photographing optical system) Z1. On the other hand, in an accommodated (radially retracted) state of the zoom lens 10 shown in FIG. 1, the third lens group 13e, the low-pass filter 13f and the CCD 13g are moved away from the photographing optical axis Z1 to be radially retracted upward in the housing 11, and the second lens group 13d is linearly retracted into the space created as a result of the upward radial retracting movement of the third lens group 13e, the low-pass filter 13f and the CCD 13g, which reduces the length of the zoom lens 10 in the retracted state thereof. The overall structure of the zoom lens 10 that includes a radially-retracting mechanism for radially retracting optical elements upward will be described hereinafter. In the following description, the vertical direction and the horizontal direction of the zoom lens camera body equipped with the zoom lens 10 as viewed from the front thereof are defined as a y-axis and an x-axis, respectively.

The housing 11 is provided with a hollow box-shaped portion 15 and a hollow fixed ring portion 16 which is formed on a front wall 15a of the box-shaped portion 15 so as to enclose the photographing optical system about the photographing optical axis Z1. A rotation center axis Z0 serving as the center of the fixed ring portion 16 is parallel to the photographing optical axis Z1 and eccentrically located below the photographing optical axis Z1. A retraction space (accommodation space) SP (FIGS. 1 and 2) is formed inside the box-shaped portion 15 and above the fixed ring portion 16.

Figure 8:
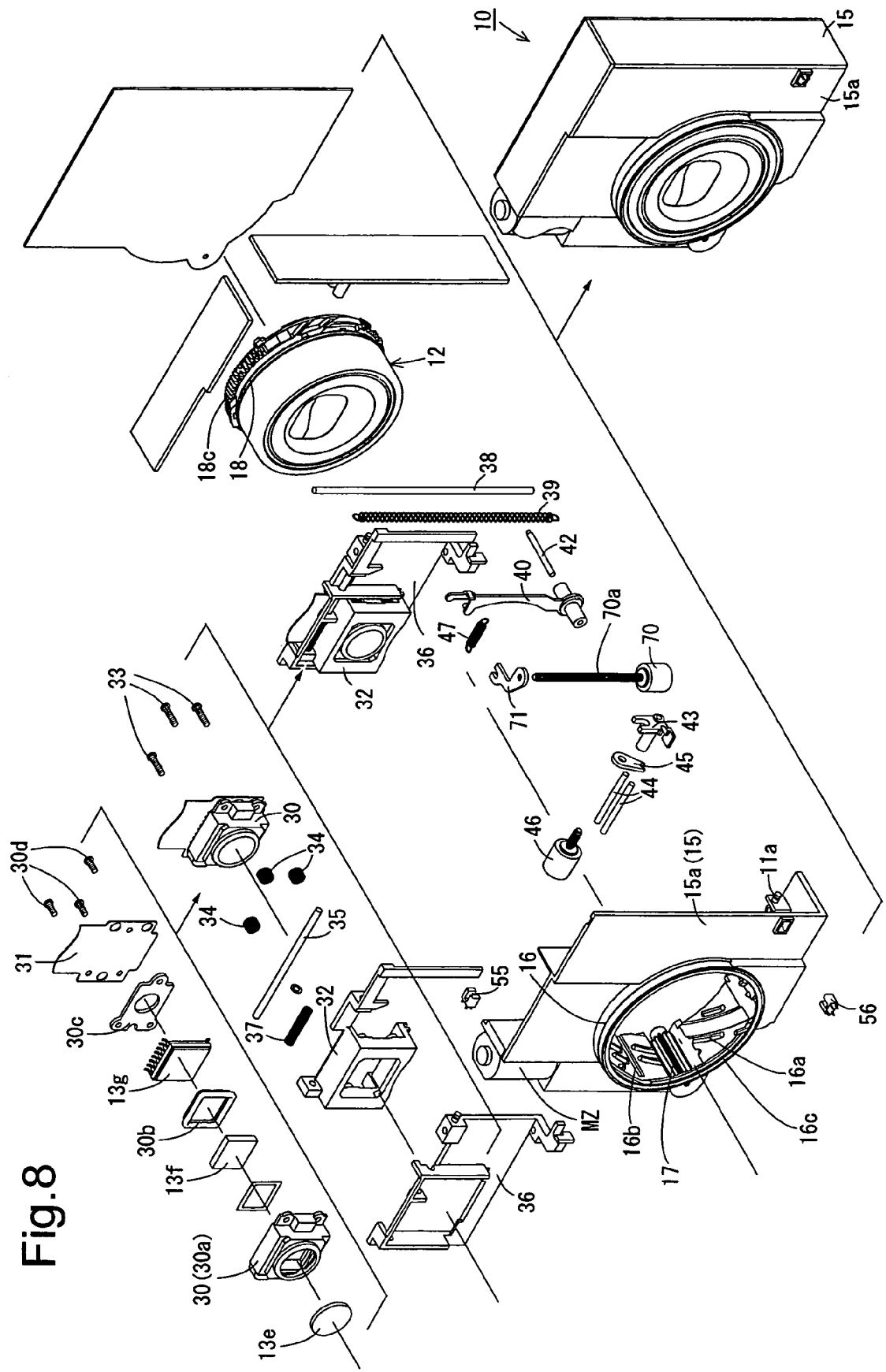
FIG. 8 is an exploded perspective view of the zoom lens shown in FIGS. 1 and 2.

A zoom gear 17 (FIGS. 8, 10 and 11) is supported on an inner peripheral surface side of the fixed ring portion 16 to be rotatable on an axis of rotation parallel to the rotation center axis Z0. The zoom gear 17 is rotated forward and reverse by a zoom motor MZ (FIGS. 5, 10, and 11) supported by the housing 11. In addition, the fixed ring portion 16 is provided on an inner peripheral surface thereof with a female helicoid 16a, a circumferential groove 16b and a plurality of linear guide grooves 16c (only one of them is shown in FIG. 8). The circumferential groove 16b is an annular groove with its center on the rotation center axis Z0, while the plurality of the linear guide grooves 16c are parallel to the rotation center axis Z0 (see FIGS. 3, 4 and 8).

Figure 10:
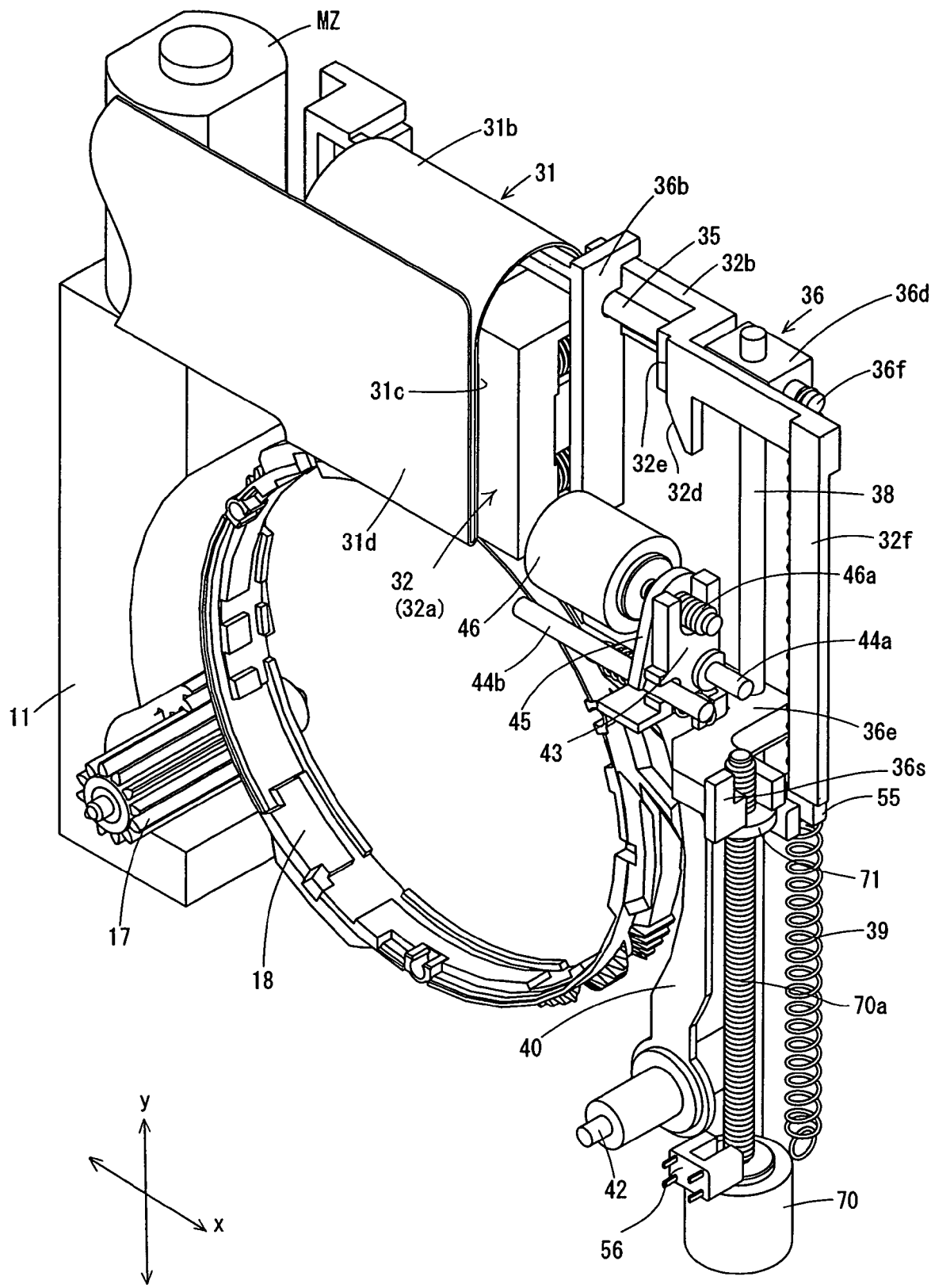
FIG. 10 is a front perspective view of the image stabilizing mechanism and the radially-retracting mechanism, illustrating the retracted state of a CCD holder in the retracted state of the zoom lens shown in FIG. 1.
Figure 11:
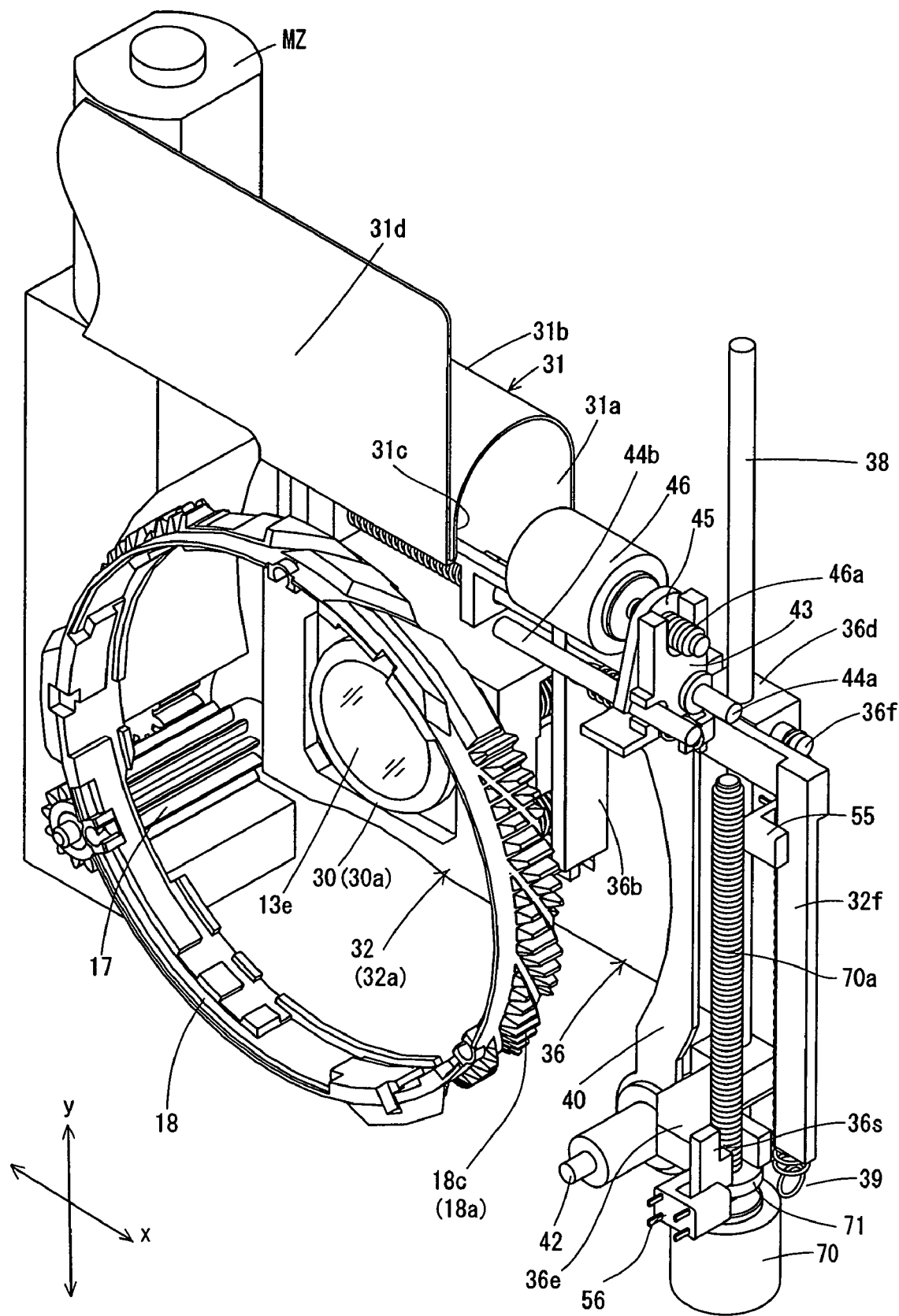
FIG. 11 is a front perspective view of the image stabilizing mechanism and the radially-retracting mechanism, illustrating the optical-axis advanced state of the CCD holder in a photographic state of the zoom lens.

A helicoid ring 18 is supported inside the fixed ring portion 16 to be rotatable about the rotation center axis Z0. The helicoid ring 18 is provided with a male helicoid 18a which is engaged with the female helicoid 16a of the fixed ring portion 16 and thus can advance and retract in the optical axis direction while rotating due to the engagement of the female helicoid 16a with the male helicoid 18a. The helicoid ring 18 is further provided, on an outer peripheral surface thereof in front of the female helicoid 18a, with a plurality of rotation guiding protrusions 18b (only two of them are shown in FIG. 8). In a state shown in FIGS. 2 through 4 in which the helicoid ring 18 advances to the frontmost position thereof with respect to the fixed ring portion 16, the female helicoid 16a and the male helicoid 18a are disengaged from each other while the plurality of rotation guiding protrusions 18b are slidably fitted in the circumferential groove 16b so that the helicoid ring 18 is prevented from further moving in the optical axis direction and is allowed only to rotate at a fixed position in the optical axis direction. The helicoid ring 18 is further provided on threads of the male helicoid 18a with an annular spur gear 18c which is in mesh with the zoom gear 17. Teeth of the spur gear 18c are aligned parallel to the photographing optical axis Z1. The zoom gear 17 is elongated in the axial direction thereof so as to remain engaged with the spur gear 18c at all times over the entire range of movement of the helicoid ring 18 from a retracted state of the helicoid ring 18 shown in FIGS. 1 and 10 to an extended state of the helicoid ring 18 shown in FIGS. 2 and 11. The helicoid ring 18 is constructed by combining two ring members which are splittable in the optical axis direction. In FIGS. 10 and 11, only the rear ring member of the helicoid ring 18 is shown.

Figure 3:
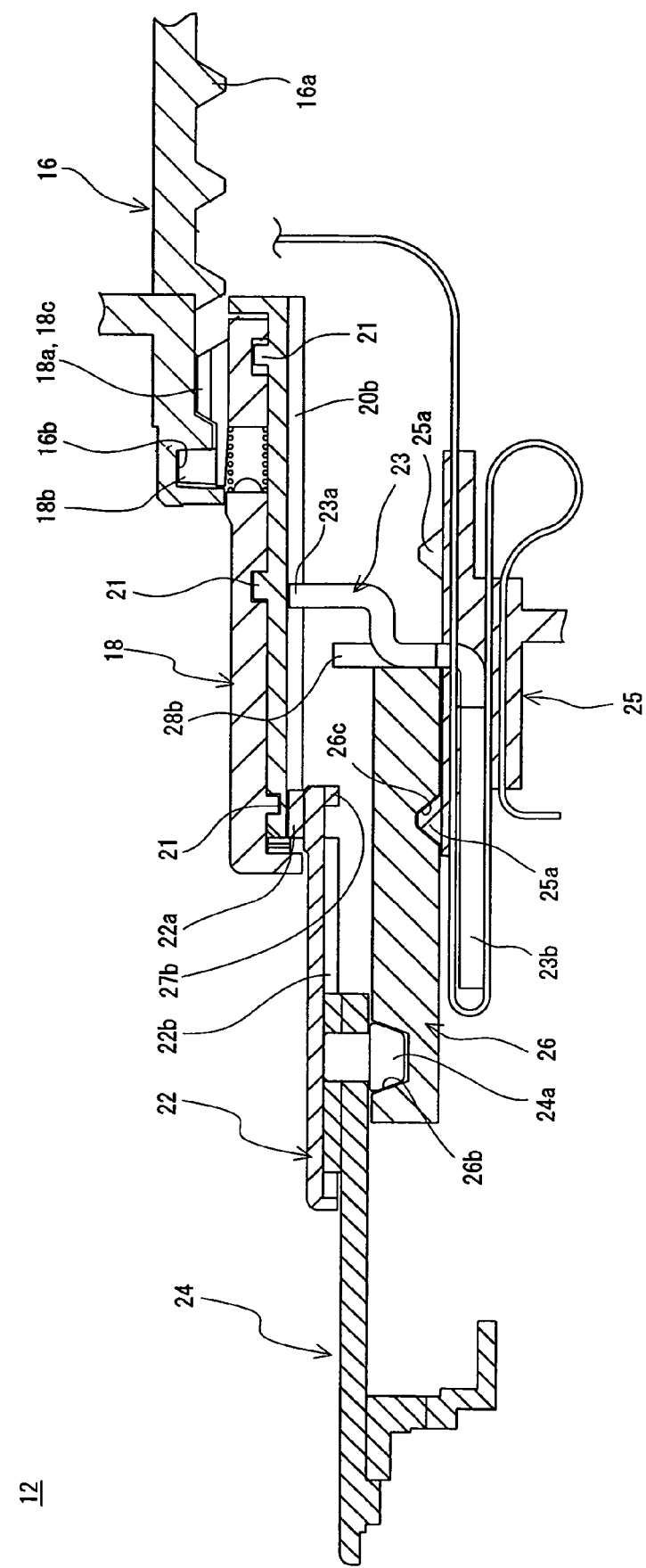
FIG. 3 is an enlarged cross-sectional view of a part of the zoom lens at the wide-angle extremity thereof.
Figure 4:
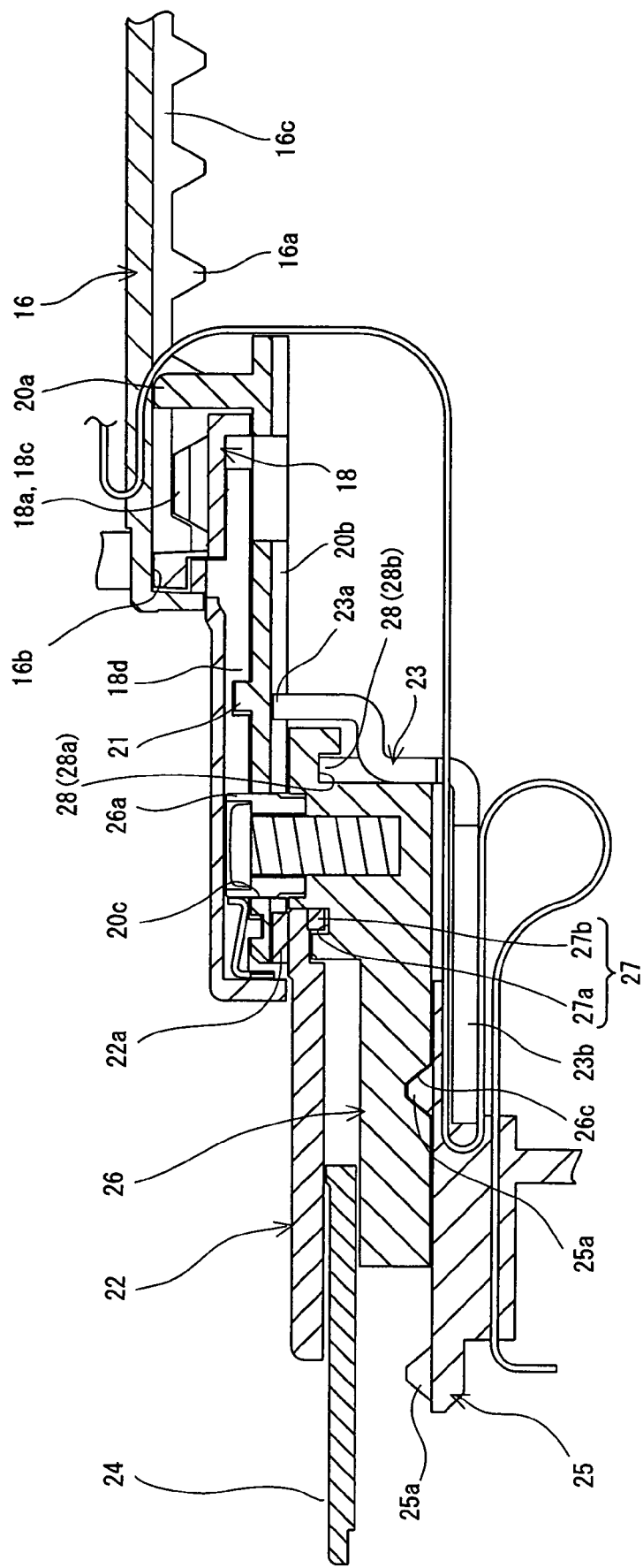
FIG. 4 is an enlarged cross-sectional view of a part of the zoom lens at the telephoto extremity thereof.

A linear guide ring 20 is supported inside the helicoid ring 18. The linear guide ring 20 is provided in the vicinity of the rear end thereof with a linear guide projection 20a, and is guided linearly along the rotation center axis Z0 (and the photographing optical axis Z1) by the slidable engagement of the linear guide projection 20a with the linear guide groove 16c of the fixed ring portion 16 as shown in FIG. 4. A rotation guiding portion 21 is provided between the inner peripheral surface of the helicoid ring 18 and the outer peripheral surface of the linear guide ring 20. The helicoid ring 18 is supported by the linear guide ring 20 to be rotatable with respect to the linear guide ring 20 and to be movable together with the linear guide ring 20 in the optical axis direction via the rotation guiding portion 21. The rotation guiding portion 21 consists of a plurality of circumferential grooves provided at different positions in the axial direction and radial protrusions, each of which is slidably engaged in the corresponding circumferential groove (see FIGS. 3 and 4).

The linear guide ring 20 is provided on an inner peripheral surface thereof with a plurality of linear guide grooves 20b (only one of them is shown in each of FIGS. 1 through 4) which extend parallel to the rotation center axis Z0 (and the photographing optical axis Z1). A plurality of linear guide projections 22a (only one of them is shown in each of FIGS. 1 through 4) which project radially outwards from a first lens group linear guide ring 22 and a plurality of linear guide projections 23a (only one of them is shown in each of FIGS. 1 through 4) which project radially outwards from a second lens group linear guide ring 23 are slidably engaged with the plurality of linear guide grooves 20b, respectively. The first lens group linear guide ring 22 guides a first lens group support frame 24 linearly in a direction parallel to the rotation center axis Z0 (and the photographing optical axis Z1) via a plurality of linear guide grooves 22b (only one of them is shown in each of FIGS. 2 and 3) formed on an inner peripheral surface of the first lens group linear guide ring 22. The second lens group linear guide ring 23 guides a second lens group support frame 25 linearly in a direction parallel to the rotation center axis Z0 (and the photographing optical axis Z1) via a plurality of linear guide keys 23b (only one of them is shown in each of FIGS. 1 through 4). The first lens group support frame 24 supports the first lens group 13a via a focusing frame 29, and the second lens group support frame 25 supports the second lens group 13d.

A cam ring 26 is provided inside the linear guide ring 20 to be rotatable about the rotation center axis Z0. The cam ring 26 is supported by the first lens group linear guide ring 22 and the second lens group linear guide ring 23 to be rotatable with respect to each of the first lens group linear guide ring 22 and the second lens group linear guide ring 23 and to movable in the optical axis direction together therewith via rotation guiding portions 27 and 28 (see FIG. 4). As shown in FIGS. 3 and 4, the rotation guiding portion 27 is composed of a discontinuous circumferential groove 27a (not shown in FIG. 3) which is formed on an outer peripheral surface of the cam ring 26, and an inner flange 27b which projects radially inwards from the first lens group linear guide ring 22 to be slidably engaged in the discontinuous circumferential groove 27a. As shown in FIGS. 3 and 4, the rotation guiding portion 28 is composed of a discontinuous circumferential groove 28a (not shown in FIG. 3) formed on an inner peripheral surface of the cam ring 26 and an outer flange 28b which projects radially outwards from the second lens group linear guide ring 23 to be slidably engaged in the discontinuous circumferential groove 28a.

As shown in FIG. 4, the cam ring 26 is provided thereon with a plurality of follower protrusions 26a (only one of them is shown in FIG. 4) which project radially outwards. The plurality of follower protrusions 26a passes through a plurality of follower guide slots 20c (only one of them is shown in FIG. 4) formed in the linear guide ring 20 to be engaged in a plurality of rotation transfer grooves 18d (only one of them is shown in FIG. 4) formed on an inner peripheral surface of the helicoid ring 18. Each rotation transfer groove 18d is parallel to the rotation center axis Z0 (and the photographing optical axis Z1), and each follower protrusion 26a is slidably engaged in the associated rotation transfer groove 18d to be prevented from moving in the circumferential direction relative to the associated rotation transfer groove 18d. Accordingly, the rotation of the helicoid ring 18 is transferred to the cam ring 26 via the engagement between the plurality of rotation transfer grooves 18d and the plurality of follower protrusions 26a. Although the development shape of each follower guide groove 20c is not shown in the drawings, each follower guide groove 20c is a guide groove including a circumferential groove portion with its center on the rotation center axis Z0 and an inclined lead groove portion parallel to the female helicoid 16a. Accordingly, when rotated by a rotation of the helicoid ring 18, the cam ring 26 rotates while moving forward or rearward along the rotation center axis Z0 (and the photographing optical axis Z1) if each follower protrusion 26a is engaged in the lead groove portion of the associated follower guide groove 20c, and rotates at a fixed position in the optical axis direction without moving forward or rearward if each follower protrusion 26a is engaged in the circumferential groove portion of the associated follower guide groove 20c.

The cam ring 26 is a double-sided cam ring having a plurality of outer cam grooves 26b (only one of them is shown in FIG. 3) and a plurality of inner cam grooves 26c (only one of them is shown in each of FIGS. 3 and 4) on outer and inner peripheral surfaces of the cam ring 26, respectively. The plurality of outer cam grooves 26b are slidably engaged with a plurality of cam followers 24a (only one of them is shown in FIG. 3) which project radially inwards from the first lens group support frame 24, respectively, while the plurality of inner cam grooves 26c are slidably engaged with a plurality of cam followers 25a (only one of them is shown in each of FIGS. 3 and 4) which project radially outwards from the second lens group support frame 25. Accordingly, when the cam ring 26 is rotated, the first lens group support frame 24 that is guided linearly in the optical axis direction by the first lens group linear guide ring 22 moves forward and rearward along the rotation center axis Z0 (and the photographing optical axis Z1) in predetermined motion in accordance with contours of the plurality of outer cam grooves 26b. likewise, when the cam ring 26 is rotated, the second lens group support frame 25 that is guided linearly in the optical axis direction by the second lens group linear guide ring 23 moves forward and rearward along the rotation center axis Z0 (and the photographing optical axis Z1) in predetermined motion in accordance with contours of the plurality of the plurality of inner cam grooves 26c.

The second lens group support frame 25 is provided with a cylindrical portion 25b (see FIGS. 1 and 2) which holds the second lens group 13d, and supports the shutter 13b and the diaphragm 13c in front of the cylindrical portion 25b to allow each of the shutter 13b and the diaphragm 13c to be opened and closed. The shutter 13b and the diaphragm 13c can be opened and closed by a shutter actuator MS and a diaphragm actuator MA (see FIG. 5), respectively, which are supported by the second lens group support frame 25.

The focusing frame 29 which holds the first lens group 13a is supported by the first lens group support frame 24 to be movable along the rotation center axis Z0 (and the photographing optical axis Z1). The focusing frame 29 can be moved forward and rearward by a focusing motor MF (see FIG. 5).

The operation of each of the zoom motor MZ, the shutter actuator MS, the diaphragm actuator MA and the focusing motor MF is controlled by the control circuit 14a. Upon turning on a main switch (switching signal generator) 14d (see FIG. 5) of the camera, the zoom motor MZ is driven to bring the zoom lens 10 to the photographic state shown in FIG. 2. Upon turning off the main switch 14d, the zoom lens 10 is moved from the photographic state to the retracted state shown in FIG. 1.

The above described operation of the zoom lens 10 is summarized as follows. Upon turning on the main switch 14d in the retracted state of the zoom lens 10 shown in FIG. 1, the zoom gear 17 is driven to rotate in a lens barrel advancing direction. Accordingly, the helicoid ring 18 moves forward in the optical axis direction while rotating, and simultaneously, the linear guide ring 20 linearly moves forward in the optical axis direction together with the helicoid ring 18. In addition, the rotation of the helicoid ring 18 causes the cam ring 26 to move forward in the optical axis direction while rotating relative to the linear guide ring 20. The first lens group linear guide ring 22 and the second lens group linear guide ring 23 linearly move forward in the optical axis direction together with the cam ring 26. Each of the first lens group support frame 24 and the second lens group support frame 25 moves in the optical axis direction relative to the cam ring 26 in predetermined motion. Therefore, the moving amount of the first lens group 13a in the optical axis direction when the zoom lens 10 is extended from the retracted state thereof is determined by adding the moving amount of the cam ring 26 relative to the fixed ring portion 16 to the moving amount of the first lens group support frame 24 relative to the cam ring 26 (the advancing/retracting amount of the first lens group support frame 24 by the cam groove 26b). Furthermore, the moving amount of the second lens group 13d in the optical axis direction when the zoom lens 10 is extended from the retracted state thereof is determined by adding the moving amount of the cam ring 26 relative to the fixed ring portion 16 to the moving amount of the second lens group support frame 25 relative to the cam ring 26 (the advancing/retracting amount of the second lens group support frame 25 by the cam groove 26c).

Figure 6:
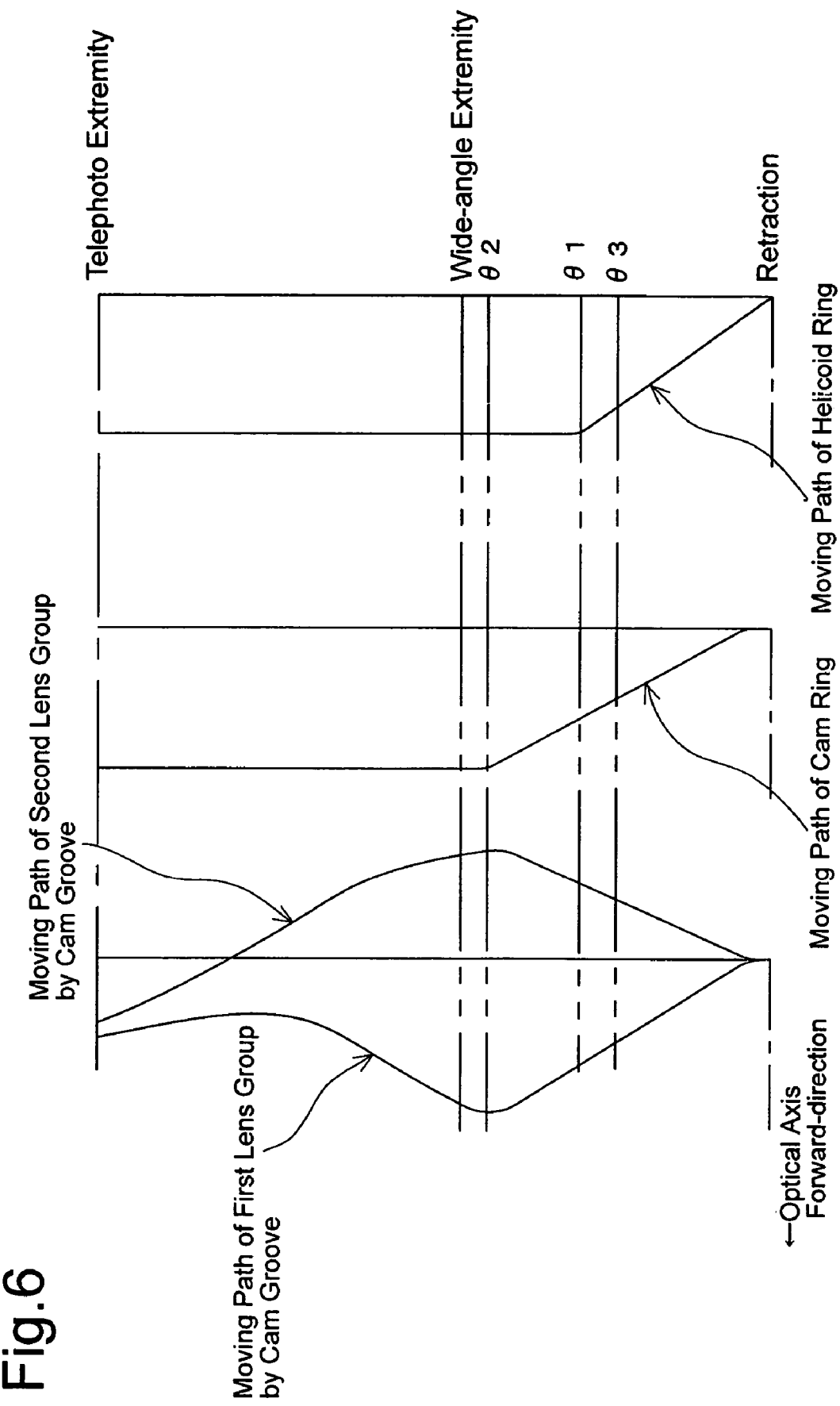
FIG. 6 is a conceptual diagram showing the moving paths of a helicoid ring and a cam ring and the moving paths of a first lens group and a second lens group by movement of the cam ring.
Figure 7:
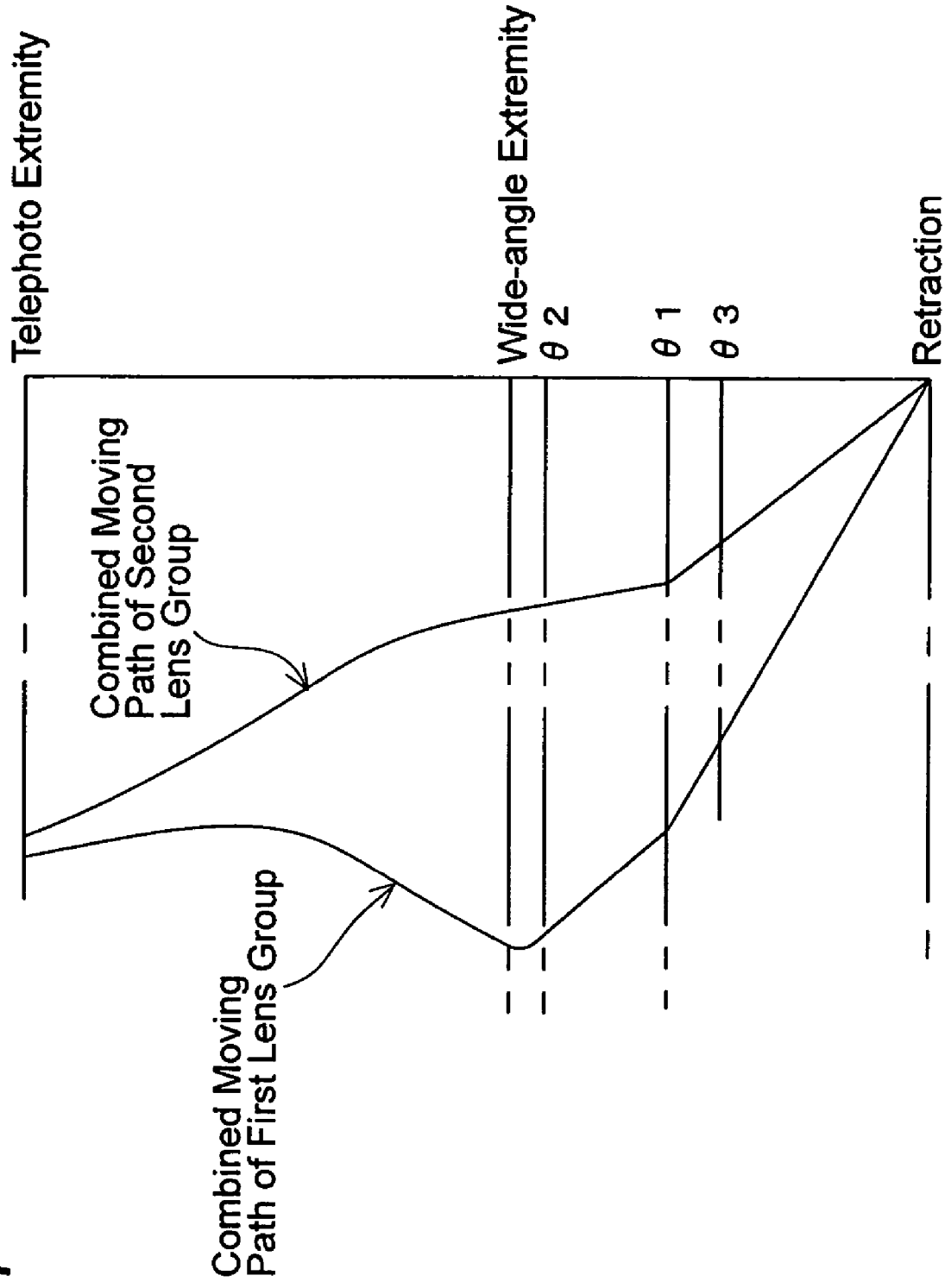
FIG. 7 is a conceptual diagram showing the combined moving path of each of the first lens group and the second lens group, in which the moving paths of the helicoid ring and the cam ring are included.

FIG. 6 shows the moving paths of the helicoid ring 18 and the cam ring 26 and the moving paths of the first lens group 13a and the second lens group 13d relative to the cam ring 26 (the cam diagrams of the cam grooves 26b and 26c). The vertical axis represents the amount of rotation (angular position) of the lens barrel from the retracted state of the zoom lens 10 to the telephoto extremity thereof, and the horizontal axis represents the amount of movement of the lens barrel in the optical axis direction. As shown in FIG. 6, the helicoid ring 18 is moved forward in the optical axis direction while rotating up to an angular position θ1 which is located at about the midpoint in the range of extension of the zoom lens 10 from the retracted position (shown in FIG. 1) to the wide-angle extremity (shown by the upper half of the zoom lens 10 from the photographing optical axis Z1 and shown in FIG. 2), whereas the helicoid ring 18 rotates at a fixed position in the optical axis direction as described above in the range of extension of the zoom lens 10 from the angular position θ1 to the telephoto extremity (shown by the lower half of the zoom lens 10 from the photographing optical axis Z1 and shown in FIG. 4). On the other hand, the cam ring 26 is moved forward in the optical axis direction while rotating up to an angular position θ2 which is located immediately behind the wide-angle extremity of the zoom lens 10 in the range of extension of the zoom lens 10 from the retracted position to the wide-angle extremity, whereas the cam ring 26 rotates at a fixed position in the optical axis direction as described above in the range of extension of the zoom lens 10 from the angular position θ2 to the telephoto extremity, similar to the helicoid ring 18. In the zooming range from the wide-angle extremity to the telephoto-extremity, the moving amount of the first lens group 13a in the optical axis direction is determined from the moving amount of the first lens group support frame 24 relative to the cam ring 26 which rotates at a fixed position in the optical axis direction (the advancing/retracting amount of the first lens group support frame 24 via the cam groove 26b), while the moving amount of the second lens group 13d in the optical axis direction is determined from the moving amount of the second lens group support frame 25 relative to the cam ring 26 which rotates at a fixed position in the optical axis direction (the advancing/retracting amount of the second lens group support frame 25 via the cam groove 26c). The focal length of the zoom lens 10 is varied by the relative movement in the optical axis direction between the first lens group 13a and the second lens group 13d. FIG. 7 shows the actual moving path of the first lens group 13a which is obtained by combining the moving amounts of the helicoid ring 18 and the cam ring 26 with the moving amount of the first lens group 13a by the cam groove 26b, and the actual moving path of the second lens group 13d which is obtained by combining the moving amounts of the helicoid ring 18 and the cam ring 26 with the moving amount by the cam groove 26c.

In the zooming range from the wide-angle extremity to the telephoto extremity, a focusing operation is performed by moving the first lens group 13a in the optical axis direction independently of other optical elements by the focusing motor MF.

The operations of the first lens group 13a and the second lens group 13d have been described above. In the zoom lens 10 of the present embodiment, the optical elements of the zoom lens 10 from the third lens group 13e to the CCD 13g are retractable away from the photographing position on the photographing optical axis Z1 to an off-optical-axis retracted position (radially retracted position) Z2 located above the photographing position as described above. In addition, by moving the optical elements from the third lens group 13e to the CCD 13g on a plane perpendicular to the photographing optical axis Z1, image shake can also be counteracted. The retracting mechanism and the image stabilizing mechanism will be discussed hereinafter.

Figure 17:
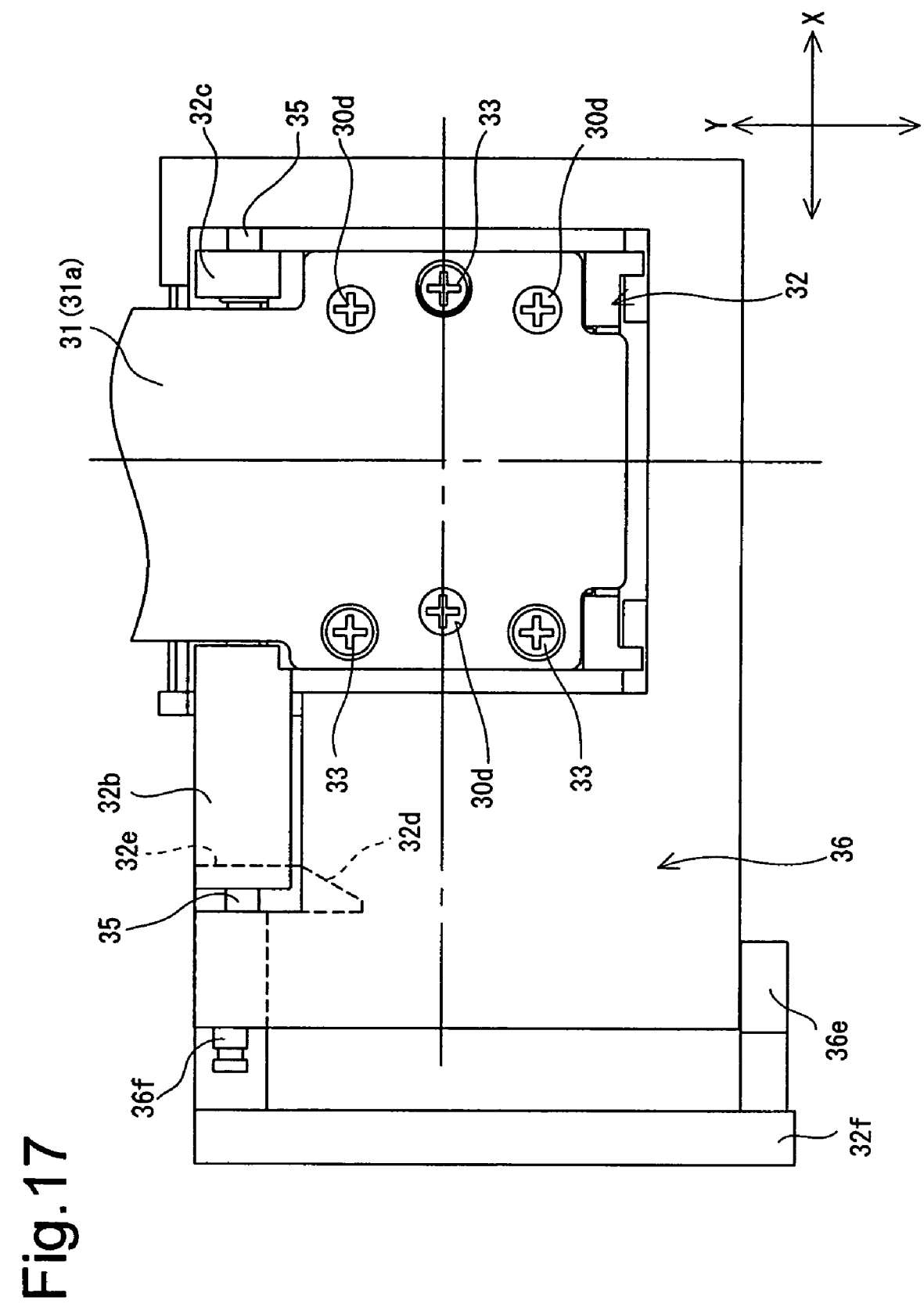
FIG. 17 is a rear view of the horizontal moving frame, the vertical moving frame and the associated elements shown in FIGS. 15 and 16.
Figure 18:
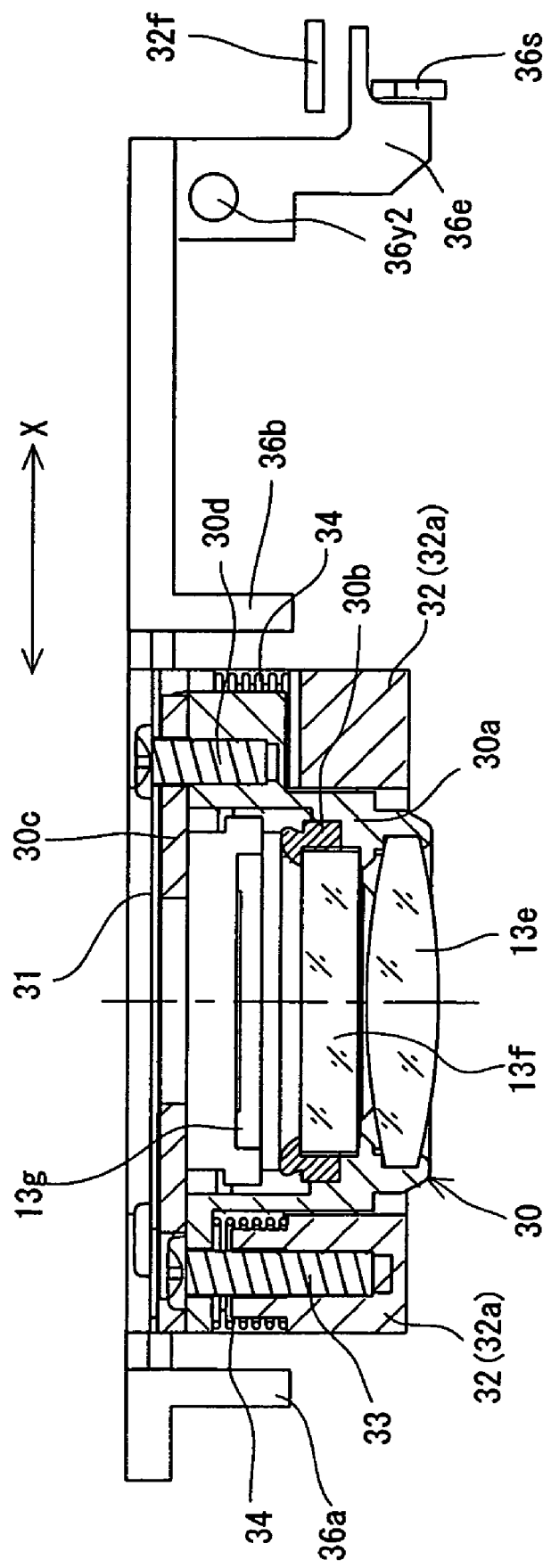
FIG. 18 is a cross-sectional view of the CCD holder, the horizontal moving frame, the vertical moving frame and other elements, taken along a D1-D1 line shown in FIG. 16.

As shown in FIGS. 8 and 18, the third lens group 13e, the low-pass filter 13f and the CCD 13g are held by a CCD holder 30 to be provided as a unit. The CCD holder 30 is provided with a holder body 30a, a sealing member 30b and a pressure plate 30c. The third lens group 13e is held by the holder body 30a at a front end aperture thereof. The low-pass filter 13f is held between a flange formed on an inner surface of the holder body 30a and the sealing member 30b, and the CCD 13g is held between the sealing member 30b and the pressure plate 30c. The holder body 30a and the pressure plate 30c are fixed to each other by three fixing screws 30d (see FIGS. 17 and 18) separately arranged around the central axis of the CCD holder 30 (the photographing optical axis Z1 in a photographic state of the zoom lens 10). The three fixing screws 30d also secure one end portion of an image transmission flexible PWB 31 to the rear surface of the pressure plate 30c so that a supporting substrate of the CCD 13g is electrically connected to the image transmission flexible PWB 31.

The image transmission flexible PWB 31 extends from its connection end at the CCD 13g to the retraction space SP in the housing 11. The image transmission flexible PWB 31 is provided with a first linear portion 31a, a U-shaped portion 31b, a second linear portion 31c, and a third linear portion 31d (see FIGS. 1 and 2). The first linear portion 31a is substantially orthogonal to the photographing optical axis Z1 and extends upward. The U-shaped portion 31b is bent forward from the first linear portion 31a. The second linear portion 31c extends downward from the U-shaped portion 31b. The third linear portion 31d is folded upward from the second linear portion 31c. The third linear portion 31d is fixed to an inner surface of the front wall 15a of the housing 11 therealong. The first linear portion 31a, the U-shaped portion 31b and the second linear portion 31c (except the third linear portion 31d) serve as a free-deformable portion which is freely resiliently deformable according to the motion of the CCD holder 30.

The CCD holder 30 is supported by a horizontal moving frame (an element of a second guiding device) 32 via three adjusting screws 33 (see FIGS. 17 and 18) separately arranged around the central axis of the CCD holder 30 (the photographing optical axis Z1 in a ready-photograph state of the zoom lens 10). Three compression coil springs 34 are installed between the CCD holder 30 and the horizontal moving frame 32. The shaft portions of the three adjusting screws 33 are inserted into the three compression coil springs 34, respectively. When the tightening amounts of the adjusting screws 33 are changed, the respective compression amounts of the coil springs 34 are changed. The adjusting screws 33 and the compression coil springs 34 are provided at three different positions around the optical axis of the third lens group 13e, and accordingly, the inclination of the CCD holder 30 with respect to the horizontal moving frame 32, or the inclination of the optical axis of the third lens group 13e with respect to the photographing optical axis Z1, can be adjusted by changing the tightening amounts of the three adjusting screws 33.

Figure 15:
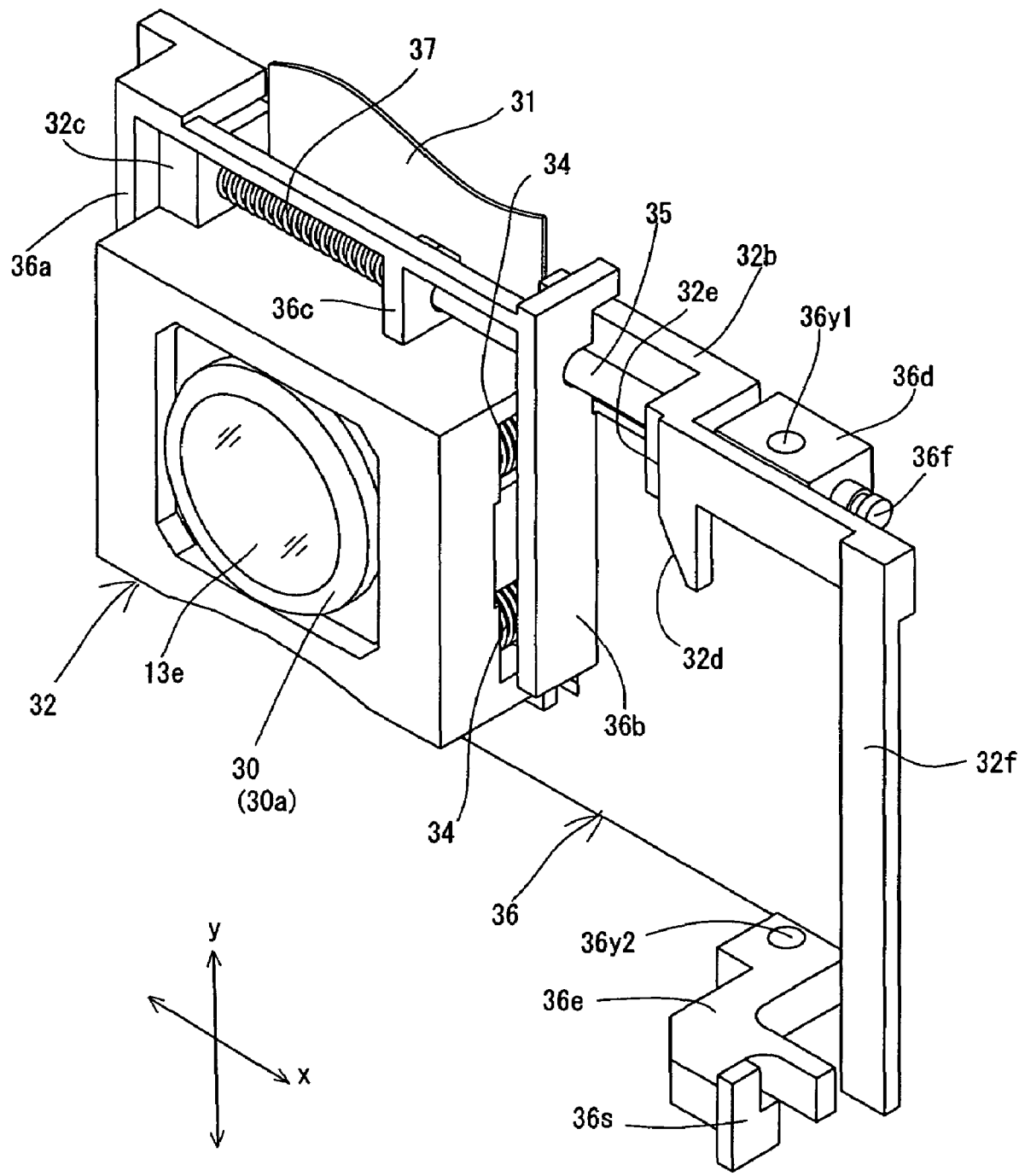
FIG. 15 is a front perspective view of a horizontal moving frame and a vertical moving frame which support the CCD holder, and associated elements.
Figure 16:
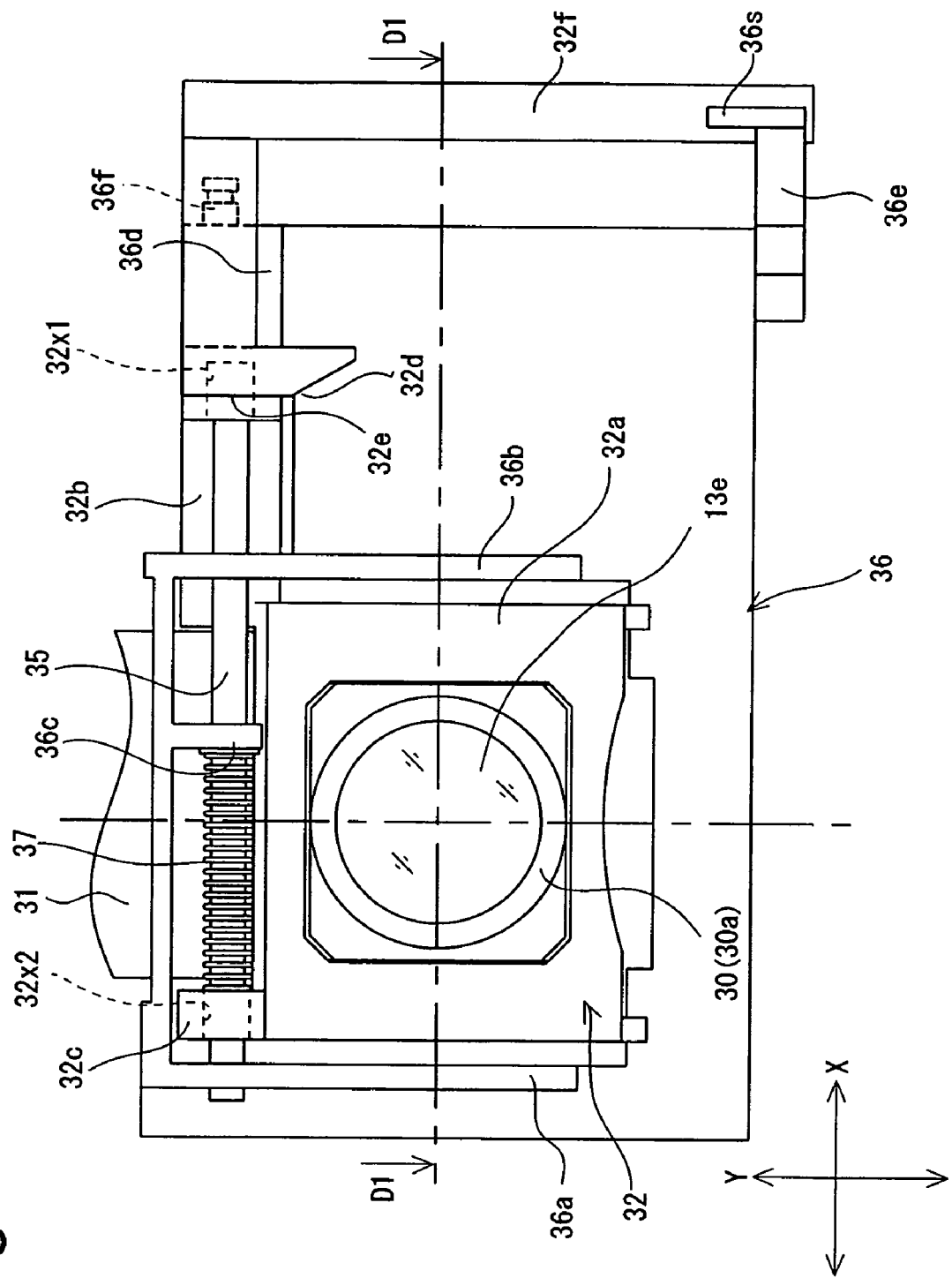
FIG. 16 is a front view of the horizontal moving frame, the vertical moving frame and the associated elements shown in FIG. 15.

As shown in FIG. 15, the horizontal moving frame 32 is supported by a vertical moving frame (an element of a guiding device/holder which holds the retractable optical element) 36 to be movable with respect thereto via a horizontal guide shaft (an element of the second guiding device) 35 extending in the x-axis direction. Specifically, the horizontal moving frame 32 is provided with a rectangular frame portion 32a which encloses the CCD holder 30 and an arm portion 32b which extends horizontally from the frame portion 32a. A spring supporting protrusion 32c is formed on an upper surface of the frame portion 32a, and an inclined surface 32d and a position restricting surface 32e are formed on an end portion of the arm portion 32b. The position restricting surface 32e is a flat surface parallel to the y-axis. On the other hand, the vertical moving frame 36 is provided with a pair of motion restricting frames 36a and 36b, a spring supporting portion 36c, an upper bearing portion 36d, and a lower bearing portion 36e. The pair of motion restricting frames 36a and 36b are provided spaced apart in the x-axis direction. The spring supporting portion 36c is located between the pair of the motion restricting frames 36a and 36b. The upper bearing portion 36d is located on a line extended from the spring supporting portion 36c in the x-axis direction. The lower bearing portion 36e is located below the upper bearing portion 36d. As shown in FIG. 16, the horizontal moving frame 32 is supported by the vertical moving frame 36 in a state where the frame portion 32a is positioned in the space between the pair of motion restricting frames 36a and 36b and where the inclined surface 32d and the position restricting surface 32e of the arm portion 32b are positioned between the motion restricting frame 36b and the upper bearing portion 36d.

One end of the horizontal guide shaft 35 is fixed to the motion restricting frame 36a of the vertical moving frame 36, and the other end of the horizontal guide shaft 35 is fixed to the upper bearing portion 36d of the vertical moving frame 36. Two through-holes are respectively formed in the motion restricting frame 36b and the spring supporting portion 36c to be horizontally aligned to each other so as to allow the horizontal guide shaft 35 to pass through the motion restricting frame 36b and the spring supporting portion 36c. Horizontal through-holes 32x1 and 32x2 (see FIG. 16) into which the horizontal guide shaft 35 is inserted are formed in the arm portion 32b and the spring supporting protrusion 32c of the horizontal moving frame 32, respectively. The horizontal through-holes 32x1 and 32x2 of the horizontal moving frame 32 and the aforementioned two through-holes which are respectively formed in the motion restricting frame 36b and the spring supporting portion 36c are horizontally aligned with each other. Since the horizontal guide shaft 35 is slidably fitted in the horizontal through-holes 32x1 and 32x2, the horizontal moving frame 32 is supported by the vertical moving frame 36 to be movable with respect to the vertical moving frame 36 in the x-axis direction. A horizontal moving frame biasing spring 37 is installed on the horizontal guide shaft 35 between the spring supporting protrusion 32c and the spring supporting portion 36c. The horizontal moving frame biasing spring 37 is a compression coil spring and biases the horizontal moving frame 32 in a direction (leftward as viewed in FIG. 16) to make the spring supporting protrusion 32c approach the motion restricting frame 36a.

Vertical through-holes 36y1 and 36y2 (see FIG. 15) are further formed in the upper bearing portion 36d and the lower bearing portion 36e of the vertical moving frame 36, respectively, which extend in a line along the y-axis direction which is orthogonal to the photographing optical axis Z1. The vertical through-hole 36y1 and the vertical through-hole 36y2 are vertically aligned, and a vertical guide shaft (an element of the guiding device/first linear guide shaft) 38 (see FIGS. 8 and 9) passes through vertical through-hole 36y1 and the vertical through-hole 36y2. Both ends of the vertical guide shaft 38 are fixed to the housing 11, and therefore, the vertical moving frame 36 can move along the vertical guide shaft 38 in the y-axis direction inside the camera. More specifically, the vertical moving frame 36 can move between the photographing position shown in FIG. 1 and the retracted position shown in FIG. 2. When the vertical moving frame 36 is positioned in the photographing position as shown in FIG. 2, the centers of the third lens group 13e, the low-pass filter 13f and the CCD 13g in the CCD holder 30 are positioned on the photographing optical axis Z1. When the vertical moving frame 36 is positioned in the radially retracted position as shown in FIG. 1, the centers of the third lens group 13e, the low-pass filter 13f and the CCD 13g are positioned in the off-optical-axis retracted position Z2 that is located above the fixed ring portion 16.

The vertical moving frame 36 is provided with a spring hooking portion 36f which projects horizontally from a side surface of the vertical moving frame 36 in a direction away from the vertical through-hole 36y1, and a vertical moving frame biasing spring (biasing device) 39 is extended between the spring hooking portion 36f and a spring hooking portion 11a (see FIG. 8) fixed to the housing 11 therein. The vertical moving frame biasing spring 39 is an extension coil spring and biases the vertical moving frame 36 downward (i.e., toward the photographing position thereof shown in FIG. 2).

As described above, the horizontal moving frame 32 that holds the CCD holder 30 is supported by the vertical moving frame 36 to be movable in the x-axis direction with respect to the vertical moving frame 36, and the vertical moving frame 36 is supported by the housing 11 via the vertical guide shaft 38 to be movable in the y-axis direction with respect to the housing 11. Image shake can be counteracted by moving the CCD holder 30 in the x-axis direction and the y-axis direction. To this end, the zoom lens 10 is provided with a driving device which achieves such movement of the CCD holder 30. This driving device will be discussed hereinafter.

Figure 9:
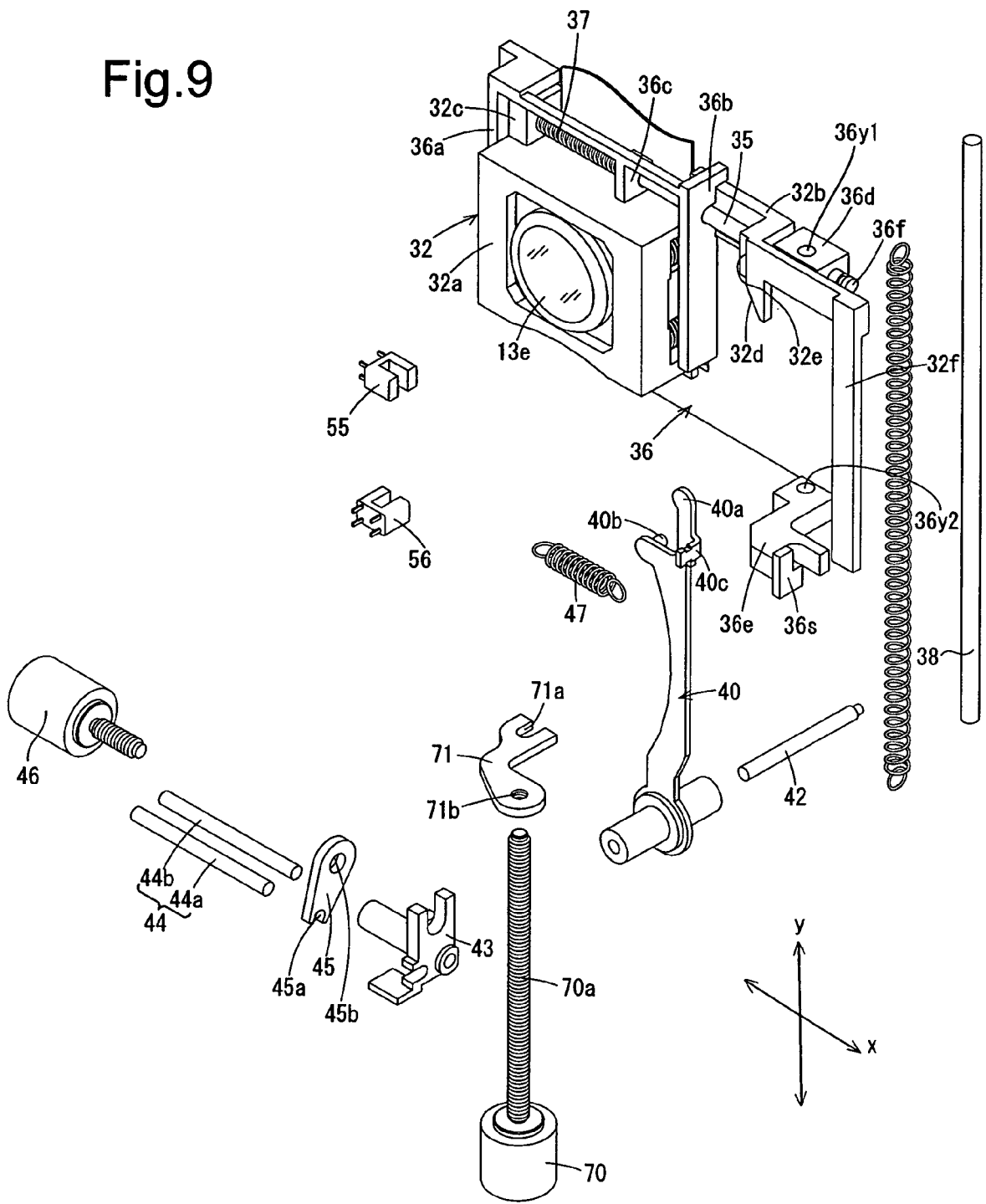
FIG. 9 is an exploded perspective view of elements of an image stabilizing mechanism and a radially-retracting mechanism which are shown in FIG. 8.
Figure 12:
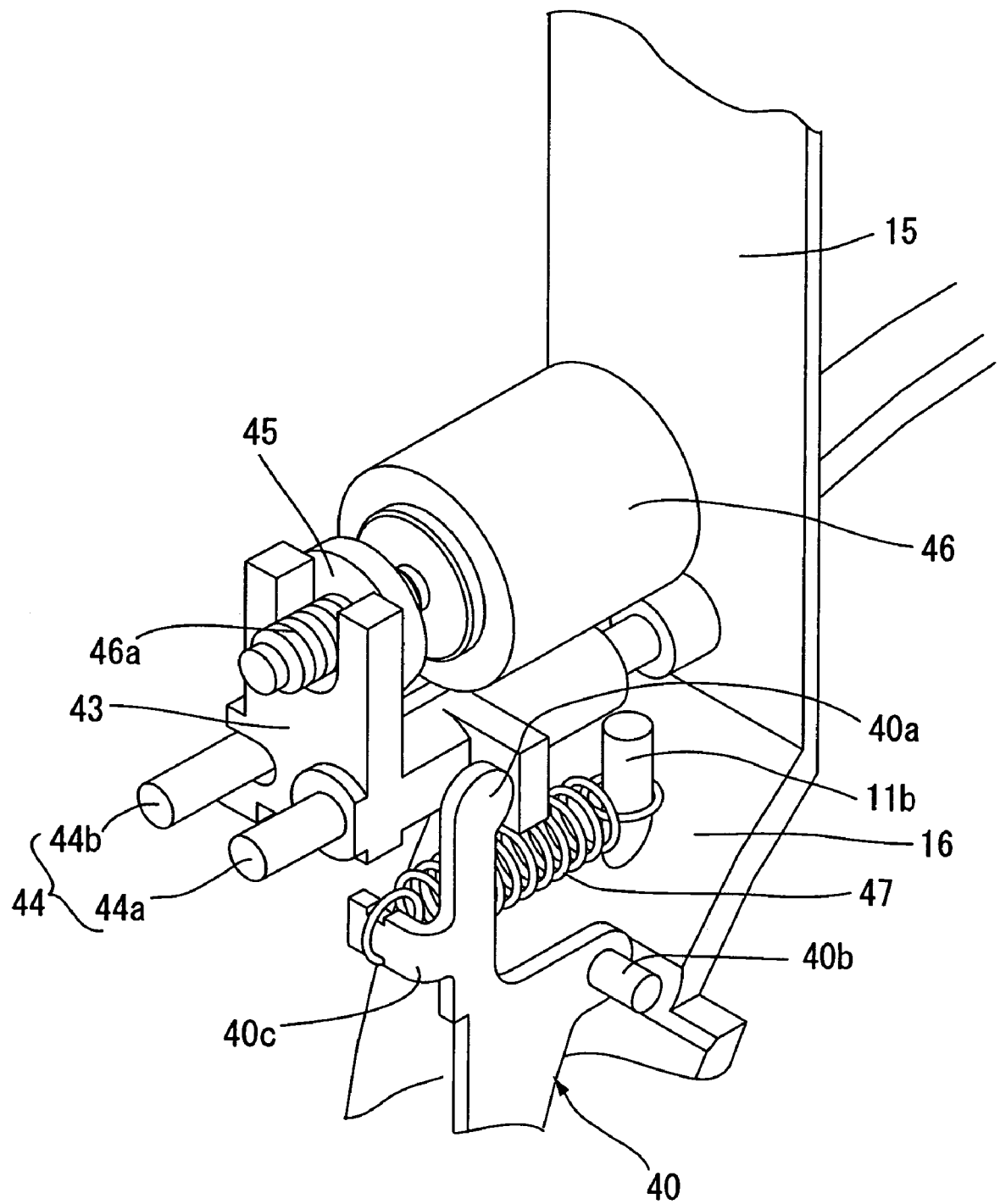
FIG. 12 is a rear perspective view of a portion of the image stabilizing mechanism as viewed from the rear side of FIGS. 10 and 11.
Figure 13:
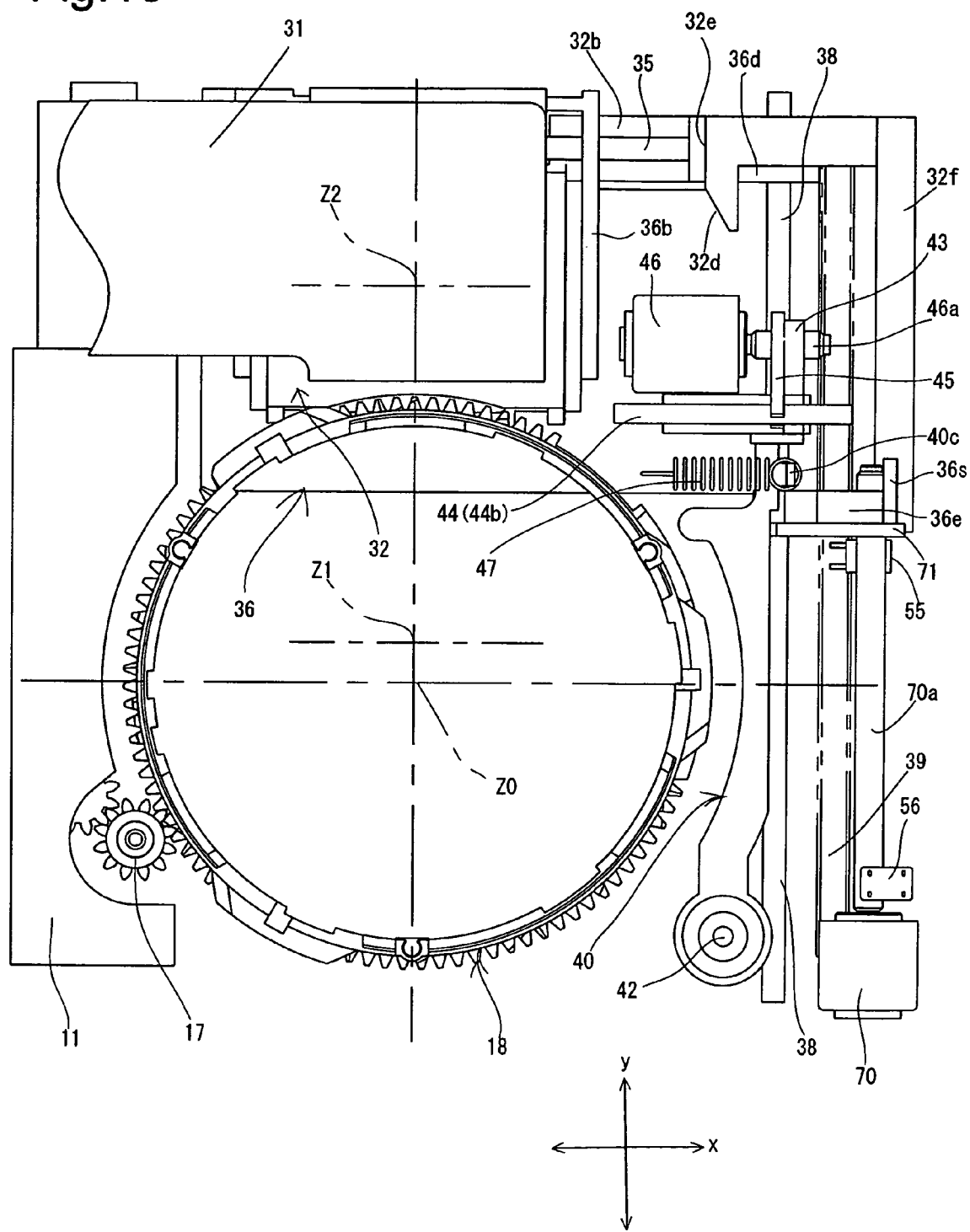
FIG. 13 is a front elevational view of the image stabilizing mechanism and the radially-retracting mechanism in the state shown in FIG. 10, as viewed from the front in the optical axis direction.
Figure 14:
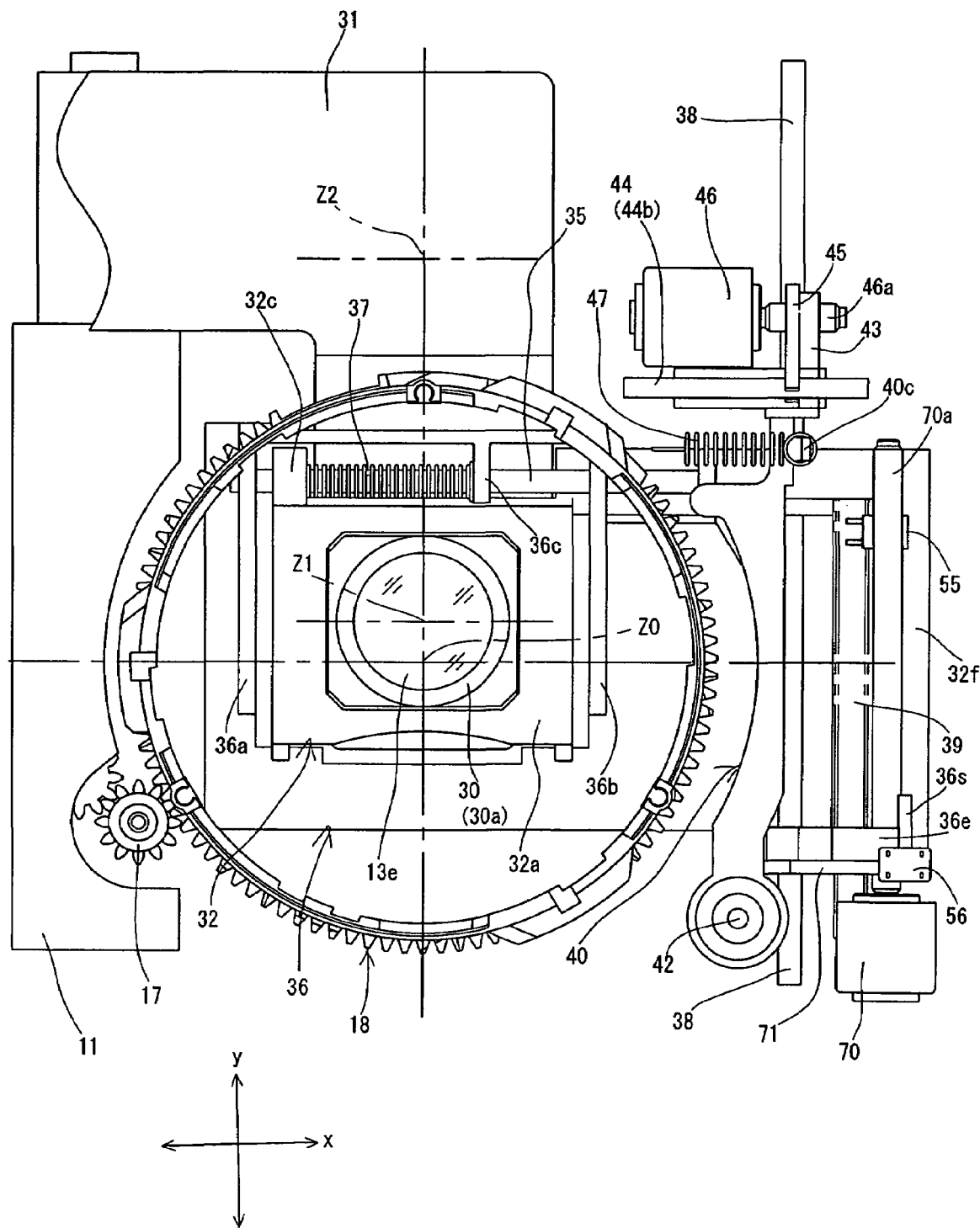
FIG. 14 is a front elevational view of the image stabilizing mechanism and the radially-retracting mechanism in the state shown in FIG. 11, as viewed from the front in the optical axis direction.
Figure 19:
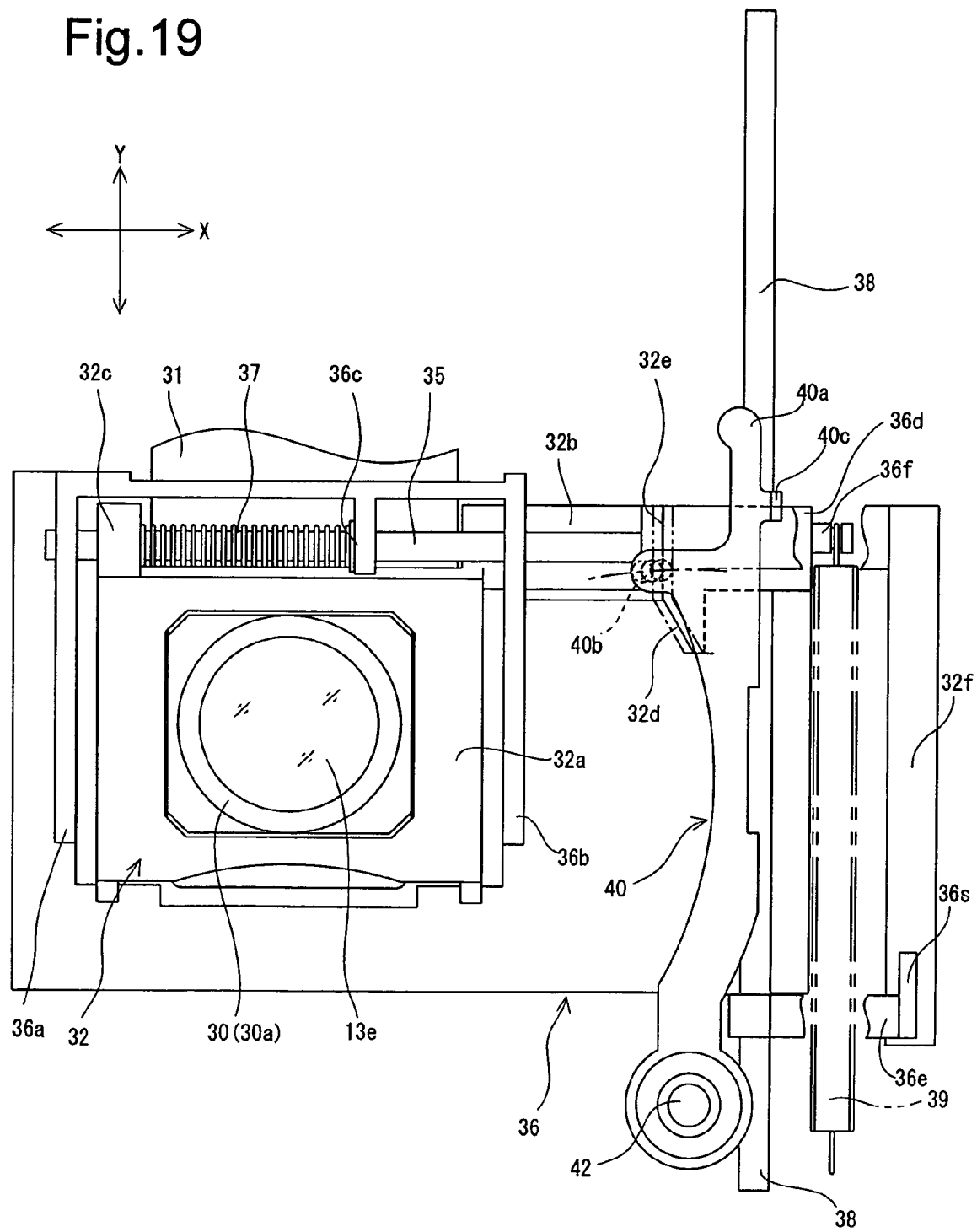
FIG. 19 is a front elevational view of the elements shown in FIGS. 15 through 18 and other associated elements, illustrating an image stabilizing action in the horizontal direction by an operation of a horizontal driving lever.

This driving device is provided with a horizontal driving lever 40. As shown in FIGS. 9 and 19, the horizontal driving lever 40 is pivoted at the lower end thereof on a lever pivot shaft 42 which provided in the housing 11 and fixed thereto to be parallel to the photographing optical axis Z1. The horizontal driving lever 40 is provided at the upper end of the horizontal driving lever 40 with a force-applying end 40a. The horizontal driving lever 40 is provided in the vicinity of the force-applying end 40a with an operation pin 40b which projects rearward in the optical axis direction and a spring hooking portion 40c which projects forward in the optical axis direction. As shown in FIG. 12, the force-applying end 40a of the horizontal driving lever 40 abuts against a lug 43a of a moving member 43. The moving member 43 is supported by a pair of parallel guide bars 44 (44a and 44b) to be slidable thereon in the x-axis direction, and a driven nut member 45 abuts against the moving member 43. The driven nut member 45 is provided with a female screw hole 45b and a rotation restricting groove 45a (see FIG. 9) which is slidably fitted on the guide bar 44b. A drive shaft (a feed screw) 46a of a first stepping motor (second actuator) 46 is screwed into the female screw hole 45b. As shown in FIGS. 13 and 14, the driven nut member 45 abuts against the moving member 43 from the left side. One end of an extension coil spring 47 is hooked on the spring hooking portion 40c of the horizontal driving lever 40, and the other end of the spring 47 is hooked on a spring hooking portion 11b which projects from an inner surface of the housing 11 (see FIG. 12). The extension coil spring 47 biases the horizontal driving lever 40 in a direction to bring the moving member 43 to abut against the driven nut member 45, i.e., in a counterclockwise direction as viewed in FIGS. 13, 14 and 19. Due to this structure, driving the first stepping motor 46 causes the driven nut member 45 to move along the pair of guide bars 44, and at the same time causes the moving member 43 to move together with the driven nut member 45, thus causing the horizontal driving lever 40 to swing about the lever pivot shaft 42. Specifically, moving the driven nut member 45 rightward as viewed in FIGS. 13 and 14 causes the driven nut member 45 to press the moving member 43 in the same direction against the biasing force of the extension spring 47, thus causing the horizontal driving lever 40 to rotate clockwise as viewed in FIGS. 13 and 14. Conversely, moving the driven nut member 45 leftward as viewed in FIGS. 13 and 14 causes the moving member 43 to move in the same direction while following the leftward movement of the driven nut member 45 due to the biasing force of the extension coil spring 47, thus causing the horizontal driving lever 40 to rotate counterclockwise as viewed in FIGS. 13 and 14.

As shown in FIG. 19, the operation pin 40b of the horizontal driving lever 40 abuts against the position restricting surface 32e that is provided on the end portion of the arm portion 32b of the horizontal moving frame 32. Since the horizontal moving frame 32 is biased leftward as viewed in FIG. 19 by the horizontal moving frame biasing spring 37, the operation pin 40b remains in contact with the position restricting surface 32e. When the horizontal driving lever 40 swings, the position of the operation pin 40b changes along the x-axis direction, so that the horizontal moving frame 32 moves along the horizontal guide shaft 35. Specifically, rotating the horizontal driving lever 40 clockwise as viewed in FIG. 19 causes the operation pin 40b to press the position restricting surface 32e, which causes the horizontal moving frame 32 to move rightward as viewed in FIG. 19 against the biasing force of the horizontal moving frame biasing spring 37. Conversely, rotating the horizontal driving lever 40 counterclockwise as viewed in FIG. 19 causes the operation pin 40b to move in a direction away from the position restricting surface 32e (leftward as viewed in FIG. 19), which causes the horizontal moving frame 32 to move in the same direction while following the leftward movement of the operation pin 40b due to the biasing force of the horizontal moving frame biasing spring 37.

As shown in FIGS. 8 through 11, 13 and 14, a second stepping motor (common actuator) 70 and a driven nut member (linearly movable member) 71 are installed in the close vicinity of the vertical guide shaft 38. The second stepping motor 70 is provided with a drive shaft (feed screw shaft) 70a which extends parallel to the vertical guide shaft 38 and with which the driven nut member 71 is screw-engaged. As shown in FIG. 9, the driven nut member 71 is provided with a rotation restricting groove 71a which is slidably fitted on the vertical guide shaft 38, and a female screw hole 71b which is screw-engaged with the drive shaft 70a. Rotating the drive shaft 70a forward and reverse by driving the second stepping motor 70 causes the driven nut member 71 to move upwards and downwards in the y-axis direction along the vertical guide shaft 38. As shown in FIGS. 10, 11, 13 and 14, the driven nut member 71 is in contact with a vertical moving frame 36 from bottom thereof. Due to this structure, driving the second stepping motor 70 causes the driven nut member 71 to move along the vertical guide shaft 38, thus causing the vertical moving frame 36 to move along the vertical guide shaft 38. Specifically, moving the driven nut member 71 upward causes the driven nut member 71 to push a lower bearing portion 36e of the vertical moving frame 36 upward, so that the vertical moving frame 36 moves upward against the biasing force of the vertical moving frame biasing spring 39. Conversely, moving the driven nut member 71 downward causes the vertical moving frame 36 to move downward together with the driven nut member 71 by the biasing force of the vertical moving frame biasing spring 39.

In the above-described structure, the horizontal moving frame 32 can be caused to move left or right in the x-axis direction by driving the first stepping motor 46 forward or reverse. Furthermore, the vertical moving frame 36 can be caused to move upwards or downwards in the y-axis direction by driving the second stepping motor 70 forward or reverse.

The CCD holder 30 is supported by a horizontal moving frame 32. The horizontal moving frame 32 is provided with a plate portion 32f which is formed as a part of the arm portion 32b to extend downward from the arm portion 32b. The plate portion 32f has a substantially inverted-L shape as viewed from the front of the camera, and is elongated in the y-axis direction so that the lower end of the plate portion 32f reaches down to the close vicinity of the lower bearing portion 36e. Additionally, the vertical moving frame 36 is provided at the end of the lower bearing portion 36e with a plate portion 36s. As shown in FIGS. 8 through 11 and 13 through 14, two photo sensors 55 and 56, each having a light emitter and a light receiver which are spaced apart from each other are installed in the housing 11. The initial position of the horizontal moving frame 32 can be detected by the photo sensor 55 when the plate portion 32f passes between the light emitter and the light receiver of the photo sensor 55. The plate portion 32f and the photo sensor 55 constitute a photo interrupter. Likewise, the initial position of the vertical moving frame 36 can be detected by the photo sensor 56 when the plate portion 36s passes between the light emitter and the light receiver of the photo sensor 56. The plate portion 36s and the photo sensor 56 constitute a photo interrupter.

The present embodiment of the zoom lens camera has an image-shake detection sensor (detector) 57 (see FIG. 5) which detects the angular velocity around two axes (the vertical and horizontal axes of the camera) orthogonal to each other in a plane perpendicular to the photographing optical axis Z1. The magnitude and the direction of camera shake (vibrations) are detected by the image-shake detection sensor 57. The control circuit 14a determines a moving angle by time-integrating the angular velocity of the camera shake in the two axial directions, detected by the image-shake detection sensor 57. Subsequently, the control circuit 14a calculates from the moving angle the moving amounts of the image on a focal plane (imaging surface/light receiving surface of the CCD 13g) in the x-axis direction and in the y-axis direction. The control circuit 14 further calculates the driving amounts and the driving directions of the horizontal moving frame 32 and the vertical moving frame 36 for the respective axial directions (driving pulses for the first stepping motor 46 and the second stepping motor 70) in order to counteract the camera shake. Thereupon, the first stepping motor 46 and the second stepping motor 70 are actuated and the operations thereof are controlled in accordance with the calculated values. In this manner, each of the horizontal moving frame 32 and the vertical moving frame 36 is driven in the calculated direction by the calculated amount in order to counteract the shake of the photographing optical axis Z1 to thereby stabilize the image on the focal plane. The camera can be put into this image stabilization mode by turning on a photographing mode select switch 14e (see FIG. 5). If the switch 14e is in an off-state, the image stabilizing capability is deactivated so that a normal photographing operation is performed.

The present embodiment of the zoom lens camera uses part of the above-described image stabilizing mechanism to perform the retracting operation (radially retracting operation) of the third lens group 13e, the low-pass filter 13f and the CCD 13g toward the off-optical-axis retracted position Z2 into the retraction space SP when the zoom lens 10 is retracted from a photographic state. As shown in FIGS. 8 through 11, 13 and 14, the second stepping motor 70 is installed with the body thereof being positioned at the bottom, and the drive shaft 70a that extends upwards from the body of the second stepping motor 70 has a length greater than the amount of retracting movement of the vertical moving frame 36 in the y-axis direction. The vertical guide shaft 38, which is parallel to the drive shaft 70a, has a length greater than the length of the drive shaft 70a. This configuration makes it possible to move the vertical moving frame 36 in the y-axis direction largely beyond a predetermined range of movement of the vertical moving frame 36 which is necessary for image stabilization, i.e., for counteracting image shake. Namely, the third lens group 13e, the low-pass filter 13f and the CCD 13g, which are supported by the vertical moving frame 36, can be moved from a position on the photographing optical axis Z1 (the position shown in FIGS. 11 and 14) to the off-optical-axis retracted position Z2 (the position shown in FIGS. 10 and 13).

The control circuit 14a controls the position of the vertical moving frame 36 by driving the second stepping motor 70 in accordance with the status of the zoom lens 10. Firstly, when the zoom lens 10 is in the photographic state (i.e., when the focal length of the zoom lens 10 is set in between the wide-angle extremity and the telephoto extremity), the driven nut member 71 is positioned in the vicinity of the lower end of the drive shaft 70a so that the vertical moving frame 36 (together with the third lens group 13e, the low-pass filter 13f and the CCD 13g) is positioned on the photographing optical axis Z1. In this photographic state, the above described image stabilizing operation can be performed by driving the first stepping motor 46 and the second stepping motor 70 in the x-axis direction and the y-axis direction as appropriate. This image stabilizing operation is performed with the third lens group 13e, the low-pass filter 13f and the CCD 13g remaining on the photographing optical axis Z1. Namely, during the image stabilizing operation, the third lens group 13e, the low-pass filter 13f and the CCD 13g are not moved largely toward the off-optical-axis retracted position Z2 beyond the photographing optical axis Z1.

The zoom lens 10 enters the photographic state shown in FIG. 2 when the main switch 14d (see FIG. 5) of the camera is turned ON, and enters the retracted state shown in FIG. 1 when the main switch 14d is turned OFF. When the zoom lens changes from the photographic state to the retracted state upon the main switch being turned OFF, the control circuit 14a drives the zoom motor MZ to perform the retracting operation of the zoom lens 10 and simultaneously drives the second stepping motor 70 to move the driven nut member 71 upward to a position at the close vicinity of the upper end of the drive shaft 70a. Thereupon, the driven nut member 71 lifts the vertical moving frame 36 against the biasing force of the vertical moving frame biasing spring 39, which causes the vertical moving frame 36 to move to the off-optical-axis retracted position Z2 as shown in FIG. 1 while being guided along the vertical guide shaft 38. Consequently, the third lens group 13e, the low-pass filter 13f and the CCD 13g are retracted radially outwards to the off-optical-axis retracted position Z2 from a position on the photographing optical axis Z1.

The retracting operation of the vertical moving frame 36, i.e., the operation of the second stepping motor 70, is controlled to be completed at an angular position θ3 (shown in FIGS. 6 and 7) before the zoom lens 10 is fully retracted. Subsequently, from the angular position θ3 the helicoid ring 18 and the cam ring 26 further move rearward in the optical axis direction while rotating. Thereafter, when the helicoid ring 18 and the cam ring 26 reach their respective retracted positions shown in FIG. 1, the cylindrical portion 25b of the second lens group support frame 25 that holds the second lens group 13d is retracted into the space in the housing 11 which is formerly occupied by the vertical moving frame 36 when the zoom lens 10 is in the photographic state. In this manner, the thickness of the photographing optical system in the optical axis direction can be reduced in the retracted state of the zoom lens 10, which makes it possible to reduce the thickness of the zoom lens 10, which in turn makes it possible to reduce the thickness of a camera incorporating the zoom lens 10. The timing of the commencement of the retracting operation of the vertical moving frame 36 can be freely determined within the range between the wide-angle extremity and the angular position θ3 shown in FIGS. 6 and 7. In the present invention, the retracting operation of the vertical moving frame 36 that is carried out by the second stepping motor 70 is controlled so as to be started in the vicinity of the angular position θ2, at which the cam ring 26 changes its operating state between a state in which the cam ring 26 rotates at a fixed position and a state in which the cam ring 26 rotates while moving forward or rearward.

When the zoom lens 10 changes from the retracted state shown in FIG. 1 to the photographic state shown in FIG. 2, operations of the zoom lens 10 which are reverse to the above described operations of the zoom lens 10 are performed. Firstly, the control circuit 14a actuates the zoom motor MZ to start the advancing operation of the zoom lens 10 upon the main switch 14d being turned ON. At this stage, the second stepping motor 70 has not been actuated. The advancing operation of the zoom motor MZ causes the second support frame 25, which supports the second lens group 13d, to move forward from the rearmost position shown in FIG. 1. This forward movement of the second support frame 25 opens the space below the vertical moving frame 36 positioned in the retracted position (and above the photographing optical axis Z1). The advancing operation of the second support frame 25 to a position where the second support frame 25 is not overlapped by the vertical moving frame 36 in the y-axis direction has been completed by the time the lens barrel 10 reaches the angular position θ3 shown in FIGS. 6 and 7. From this state, the control circuit 14a starts driving the second stepping motor 70 so that the driven nut member 71 moves to a position in the vicinity of the lower end of the drive shaft 70a while being guided along the vertical guide shaft 38. At the same time, the vertical moving frame 36 follows the driven nut member 71 to move downward to a position on the photographing optical axis Z1, which is shown in FIGS. 11 and 14, by the biasing force of the vertical moving frame biasing spring 39.

Figure 20:
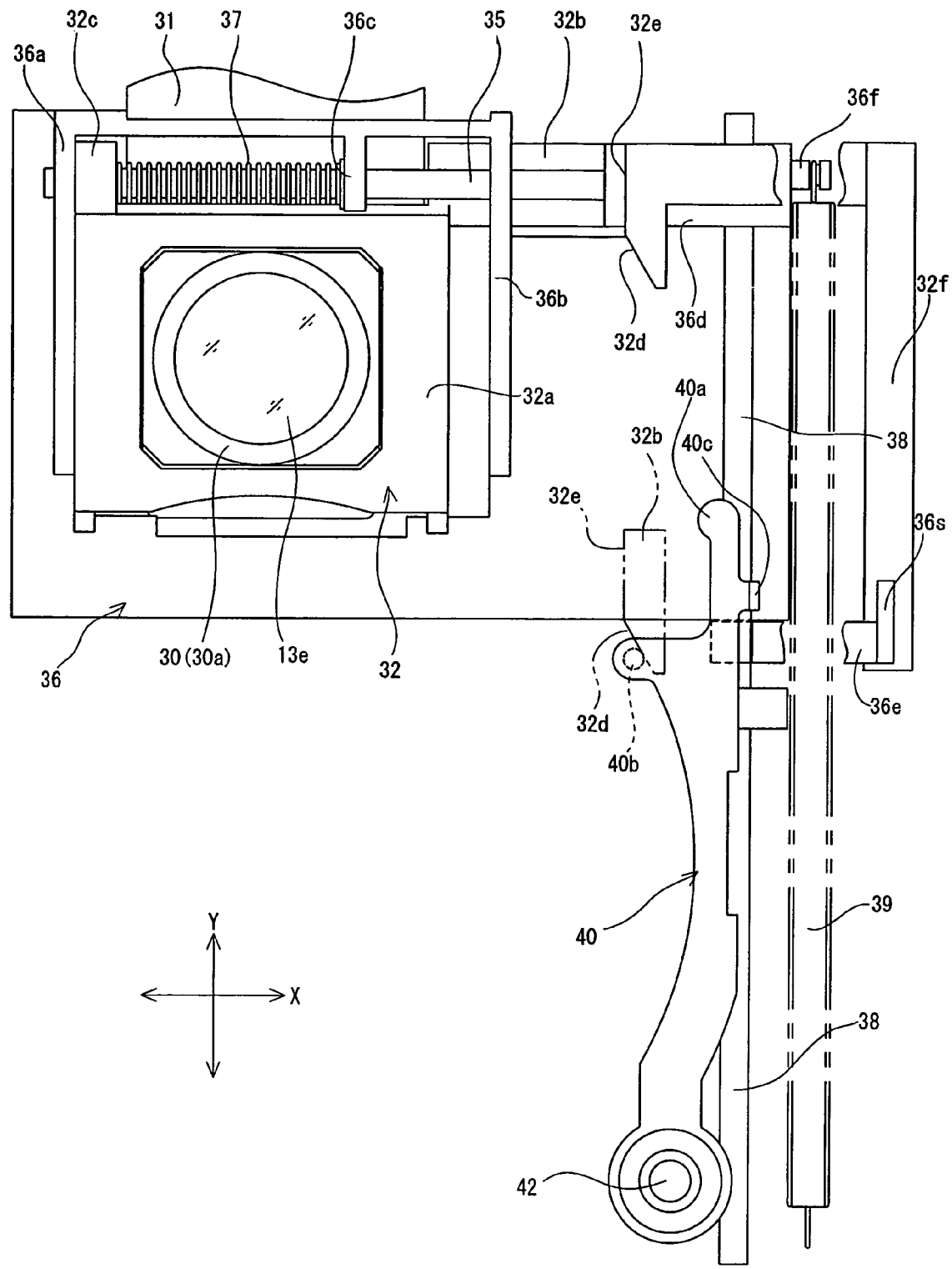
FIG. 20 is a front elevational view of elements shown in FIG. 19 for illustrating the relationship between the horizontal driving lever and the vertical motion of the CCD holder, the horizontal moving frame, and the vertical moving frame.

When the vertical moving frame 36 is retracted upward to the off-optical-axis retracted position Z2 as shown in FIG. 20, the position restricting surface 32e that is provided on the arm portion 32b of the horizontal moving frame 32 is disengaged from the operation pin 40b that is provided on the horizontal driving lever 40. This disengagement of the position restricting surface 32e from the operation pin 40b causes the horizontal moving frame 32 to move leftward as viewed in FIG. 20 by the biasing force of the horizontal moving frame biasing spring 37 up to a point at which the frame portion 32a of the horizontal moving frame 32 abuts against the motion restricting frame 36a of the vertical moving frame 36. From this state, upon the vertical moving frame 36 being moved down to the photographing optical axis Z1, the inclined surface 32d of the horizontal moving frame 32 comes in contact with the operation pin 40b as shown by two-dot chain lines in FIG. 20. The inclined surface 32d is inclined so as to guide the operation pin 40b to the position restricting surface 32e side according to the downward motion of the vertical moving frame 36. Therefore, upon the vertical moving frame 36 being moved down to the photographing position, the operation pin 40b is again engaged with the position restricting surface 32e as shown in FIG. 19 and the frame portion 32a of the horizontal moving frame 32 returns to the neutral position thereof between the motion restricting frame 36a and the motion restricting frame 36b.

As can be understood from the above description, in the present embodiment of the zoom lens 10, the vertical moving frame 36 is lifted from a position on the photographing optical axis Z1 by the driving force of the second stepping motor 70 to move a retractable optical unit which is composed of the third lens group 13e, the low-pass filter 13f and the CCD 13g to the off-optical-axis retracted position Z2 (into the retraction space SP) when the zoom lens is retracted to the retracted position. The second lens group 13d enters the space on the photographing optical axis Z1 which is created after the third lens group 13e, the low-pass filter 13f and the CCD 13g are retracted to the off-optical-axis retracted position Z2 as shown in FIG. 1, which makes it possible to reduce the thickness of the zoom lens 10 in the direction of the photographing optical axis Z1, and in turn makes it possible to achieve a compact camera incorporating the zoom lens 10 when the camera is in a non-photographing state even though the camera includes an optical image stabilizer.

The retracting movement of the vertical moving frame 36 to the off-optical-axis retracted position Z2 is performed by an operation of a y-axis direction linear drive mechanism including the vertical guide shaft 38, the second stepping motor 70, the drive nut member 71. The y-axis direction linear drive mechanism and an x-direction linear drive mechanism which include the horizontal driving lever 40, the moving member 43, the pair of guide bars 44, the driven nut member 45, the first stepping motor 46 constitute an image stabilizing mechanism (image stabilizer). Accordingly, several components are shared between the image stabilizing mechanism and the retracting mechanism (radially-retracting mechanism), which makes it possible to reduce the number of elements of each mechanism to thereby reduce the size thereof.

Specifically, in the y-direction linear driving operation, the second stepping motor 70 that is a common motor serves as both a drive source for moving the retractable optical unit, which is composed of the third lens group 13e, the low-pass filter 13f and the CCD 13g, between the photographing position on the photographing optical axis Z1 and the off-optical-axis retracted position Z2 (the retraction space SP) and a drive source for moving the retractable optical unit in the y-axis direction for image stabilization. This configuration makes it possible to achieve substantial miniaturization of the image stabilizing mechanism and the retracting mechanism (radially-retracting mechanism), as compared with the case where the image stabilizing mechanism and the retracting mechanism are provided independently of each other and driven by separate drive sources.

Although the present invention has been described based on the above illustrated embodiment, the present invention is not limited solely to these particular embodiments. For instance, although the above described embodiment is an application to a zoom lens, the present invention can be applied to an imaging device other than the above described embodiment of the zoom lens as long as the imaging device operates at least between a photographic state and an accommodated state (retracted state) and includes an optical image stabilizer which performs an image stabilizing operation in the photographic state.

Although the second stepping motor 70 that includes the drive shaft 70a is used as a common drive source for both the radially-retracting operation and the image stabilizing operation, an actuator other than such a type of drive source using a feed screw shaft can be used as the common drive source.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An imaging device comprising:
    a guiding device configured to guide at least one radially-retractable optical element, serving as part of a photographing optical system, along a guide direction between a photographing position on a common optical axis of said photographing optical system and a radially-retracted position away from said common optical axis in a plane orthogonal to said common optical axis;
    a detector configured to detect a direction and a magnitude of vibration applied to said photographing optical system; and
    a common actuator configured to move said radially-retractable optical element along said guide direction to counteract said vibration in accordance with an output of said detector when said radially-retractable optical element is in said photographing position, and for moving said radially-retractable optical element along said guide direction between said photographing position and said radially-retracted position.

2. The imaging device according to claim 1, wherein said guiding device comprises a linear guide shaft which extends in a direction perpendicular to said common optical axis and with which a holder, holding said radially-retractable optical element, is slidably engagable to be guided along said linear guide shaft,
    wherein said common actuator comprises:
    a feed screw shaft which is parallel to said linear guide shaft and is configured to be driven to rotate; and
    a linearly movable member configured to be screw-engaged with said feed screw shaft, wherein forward and rearward rotations of said feed screw shaft cause said linearly movable member to move forward and rearward along an axis of said feed screw shaft to thereby move said holder forward and rearward along said linear guide shaft, respectively.

3. The imaging device according to claim 2, wherein said linear guide shaft is longer than said feed screw shaft.

4. The imaging device according to claim 1, further comprising:
    a second guiding device which guides said radially-retractable optical element along a second guide direction different from said guide direction in said plane that is orthogonal to said common optical axis; and
    a second actuator configured to move said radially-retractable optical element along said second guide direction to counteract said vibration in accordance with said output of said detector when said radially-retractable optical element is in said photographing position.

5. The imaging device according to claim 4, wherein said guide direction of said guiding device and said second guide direction of second guiding device guide are perpendicular to each other.

6. The imaging device according to claim 5, wherein said guiding device comprises a first linear guide shaft which extends in a direction perpendicular to said common optical axis, and wherein said second guiding device comprises a second linear guide shaft which extends in a direction perpendicular to both said common optical axis and an axis of said first linear guide shaft.

7. The imaging device according to claim 1, further comprising a biasing device configured to bias said radially-retractable optical element in a direction toward said photographing position from said retracted position.

8. The imaging device according to claim 7, wherein said biasing device comprises an extension coil spring which is extended in a direction parallel to said guide direction of said guiding device.

9. The imaging device according to claim 1, wherein, when said retractable optical element is in said radially-retracted position, another optical element enters a space on said common optical axis which is occupied by said retractable optical element when said radially-retractable optical element is in said photographing position in a photographic state.

10. The imaging device according to claim 9, wherein said another optical element comprises a lens group of said photographing optical system.

11. The imaging device according to claim 1, wherein said radially-retractable optical element comprises an image sensor which is positioned at an imaging position of said photographing optical system when said radially-retractable optical element is in said photographing position in said photographic state.

12. The imaging device according to claim 11, wherein said radially-retractable optical element further comprises a rearmost lens group of said photographing optical system.

13. The imaging device according to claim 12, wherein said radially-retractable optical element further comprises a filter positioned between said rearmost lens group and said image sensor.

14. The imaging device according to claim 1, wherein said common actuator comprises a stepping motor.

15. The imaging device according to claim 4, wherein said second actuator comprises a stepping motor.

16. The imaging device according to claim 1, wherein said photographing optical system is comprises a zoom lens system.

17. An imaging device comprising:
- a driving device configured to move an image-stabilizing optical element of a photographing optical system in a plane orthogonal to a common optical axis of said photographing optical system to counteract image shake in accordance with a direction and a magnitude of vibration applied to said photographing optical system; and
- an actuator provided in said driving device,
- wherein said actuator is configured to move said image-stabilizing optical element within a predetermined range of movement for image stabilization on said common optical axis when said imaging device is in a photographic state, is configured to move said image-stabilizing optical element to an off-optical-axis retracted position away from said common optical axis when said imaging device changes from said photographic state to a non-photographing state, and is configured to move said image-stabilizing optical element from said off-optical-axis retracted position to said predetermined range of movement for image stabilization on said common optical axis when said imaging device changes from said non-photographing state to said photographic state.

18. An imaging device comprising:
- a detector configured to detect a direction and a magnitude of vibration applied to a photographing optical system;
- a switching signal generator configured to generate a switching signal for switching said photographing optical system between a photographic state and a non-photographing state; and
- an actuator configured to move an image sensor of said photographing optical system, which is positioned at an imaging position of said photographing optical system, in a plane orthogonal to a common optical axis of said photographing optical system,
- wherein said actuator is configured to move said image sensor in order to counteract said vibration in accordance with an output of said detector when said image sensor is in a photographing position on said common optical axis, and is configured to move said image sensor between said photographing position on said common optical axis and an off-optical-axis retracted position away from said common optical axis when said switching signal generator generates said switching signal.

* * * * *